United States Patent
Shulman et al.

(10) Patent No.: US 10,469,523 B2
(45) Date of Patent: Nov. 5, 2019

(54) TECHNIQUES FOR DETECTING COMPROMISES OF ENTERPRISE END STATIONS UTILIZING NOISY TOKENS

(71) Applicant: Imperva, Inc., Redwood City, CA (US)

(72) Inventors: Amichai Shulman, Tel Aviv (IL); Sagie Dulce, Hod HaSharon (IL)

(73) Assignee: Imperva, Inc., Redwood City, CA (US)

( * ) Notice: Subject to any disclaimer, the term of this patent is extended or adjusted under 35 U.S.C. 154(b) by 445 days.

(21) Appl. No.: 15/345,445

(22) Filed: Nov. 7, 2016

(65) Prior Publication Data

US 2017/0244749 A1 Aug. 24, 2017

Related U.S. Application Data

(60) Provisional application No. 62/299,479, filed on Feb. 24, 2016.

(51) Int. Cl.
*H04L 29/06* (2006.01)

(52) U.S. Cl.
CPC ...... *H04L 63/1441* (2013.01); *H04L 63/0209* (2013.01); *H04L 63/029* (2013.01); *H04L 63/1491* (2013.01)

(58) Field of Classification Search
CPC ............. H04L 63/1441; H04L 63/0209; H04L 63/029; H04L 63/1491
USPC ........................................................ 726/11
See application file for complete search history.

(56) References Cited

U.S. PATENT DOCUMENTS

| | | | |
|---|---|---|---|
| 7,493,659 B1 | 2/2009 | Wu et al. | |
| 9,961,096 B1 * | 5/2018 | Pierce | H04L 63/1425 |
| 2005/0091532 A1 | 4/2005 | Moghe | |
| 2005/0125195 A1 * | 6/2005 | Brendel | H04L 43/00 702/182 |
| 2006/0031928 A1 * | 2/2006 | Conley | H04L 63/0236 726/11 |
| 2006/0034305 A1 | 2/2006 | Heimerdinger et al. | |
| 2006/0242705 A1 | 10/2006 | Sadhasivam et al. | |
| 2007/0266149 A1 * | 11/2007 | Cobb | H04L 41/5009 709/224 |
| 2010/0077483 A1 | 3/2010 | Stolfo et al. | |

(Continued)

FOREIGN PATENT DOCUMENTS

CN 103107912 A 5/2013

OTHER PUBLICATIONS

Pedro Garcia-Teodoro, et al. "Anomaly-based network intrusion detection: Techniques, systems and challenges," 2009, pp. 18-28, Computers & Security 28, Elsevier Ltd., www.sciencedirect.com.

(Continued)

*Primary Examiner* — Jason K Gee
*Assistant Examiner* — Angela R Holmes
(74) *Attorney, Agent, or Firm* — Nicholson De Vos Webster & Elliott LLP

(57) ABSTRACT

Noisy tokens can be placed in locations of client end stations such that local operations performed upon the noisy tokens generate network traffic. A traffic monitoring module (TMM) can determine normal activity patterns of network traffic resulting from one or more of the placed noisy tokens being activated by one or more non-malicious operations, and identify that other network traffic resulting from one or more of the noisy tokens being activated does not meet the one or more normal activity patterns. In response, the TMM can cause an alert to be generated.

22 Claims, 13 Drawing Sheets

(56) References Cited

U.S. PATENT DOCUMENTS

| | | |
|---|---|---|
| 2012/0137367 A1 | 5/2012 | Dupont et al. |
| 2014/0201836 A1 | 7/2014 | Amsler |
| 2015/0047032 A1 | 2/2015 | Hannis et al. |

OTHER PUBLICATIONS

Jiong Zhang et al., "Anomaly Based Network Intrusion Detection with Unsupervised Outlier Detection," Jun. 2006, pp. 2388-2393, 2006 IEEE International Conference on Communications, vol. 5.

* cited by examiner

TECHNIQUES FOR DETECTING COMPROMISES OF ENTERPRISE END STATIONS UTILIZING NOISY TOKENS

CROSS-REFERENCE TO RELATED APPLICATIONS

This application claims priority from U.S. Provisional Application No. 62/299,479, filed on Feb. 24, 2016, the content of which is incorporated by reference.

FIELD

Embodiments of the invention relate to the field of network security; and more specifically, to techniques for detecting compromises of enterprise end stations utilizing noisy tokens.

BACKGROUND

In the field of computer security, the term honeypot is commonly used to refer to a trap set to detect, deflect, or counteract attempts at an unauthorized or malicious use of information systems. Generally, a honeypot is a decoy server or end station that appears to be part of a network, but is actually isolated and monitored, and which appears to contain information or a resource of value to attackers. Honeypots allow system operators to learn how attackers probe and attempt to gain access to end stations by maintaining a record of the attacker's activities. Further, honeypots may also gather evidence to be used to assist in the apprehension or prosecution of attackers.

In essence, honeypots are security resources that are intended to be probed, attacked, and compromised to allow for information about the attacker and the techniques of the attacker to be discovered. Production honeypots, as compared to research honeypots that seek to research threats being used, are primarily placed within a production network (i.e., a network actively used for other purposes unrelated to threat detection) along with other production computing resources used by authorized users of the production network to improve the security of the production network.

Honeypots can be classified as either high-interaction or low-interaction. High-interaction honeypots typically utilize actual computing resources and/or software (e.g., a fully-installed and configured Unix system) to interact with potential attackers to provide a detailed and complete view of an attack, whereas low-interaction honeypots typically emulate one or more potentially vulnerable services or software (e.g., a standalone File Transfer Protocol (FTP) server, or a standard Unix server with several typically attacked services, such as Finger, Telnet, and/or FTP), and thus cannot typically become infected or compromised by an attack.

Some security approaches have turned to the use of "honey tokens" to attempt to detect intrusions. The term "honey token" refers to honeypots that are not servers or server end stations. Instead, honey tokens are typically pieces of information placed in server data repositories that are easy to detect when used, and are rarely (if ever) used by an authorized user. For example, a honey token could be a user account configured for a server or server end station that is not assigned to or used by any authorized user, or a database entry that would typically only be selected by a malicious query. Thus, a compromise of the server can be identified when a honey token is detected outside of the server's data repository, or when an access to the honey token within the server data repository occurs. For example, upon an attempted use of the user account honey token (e.g., an attempt to log on to a server) or an attempted access of the database entry including a honey token, an alarm can be issued to indicate the compromise.

However, successfully deploying and utilizing honeypots and honey tokens in enterprises has proven challenging. For example, some honey tokens can tend to cause many false alarms if they are inadvertently used, and deployed honey tokens can become ineffective if they are inadvertently removed by a user.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
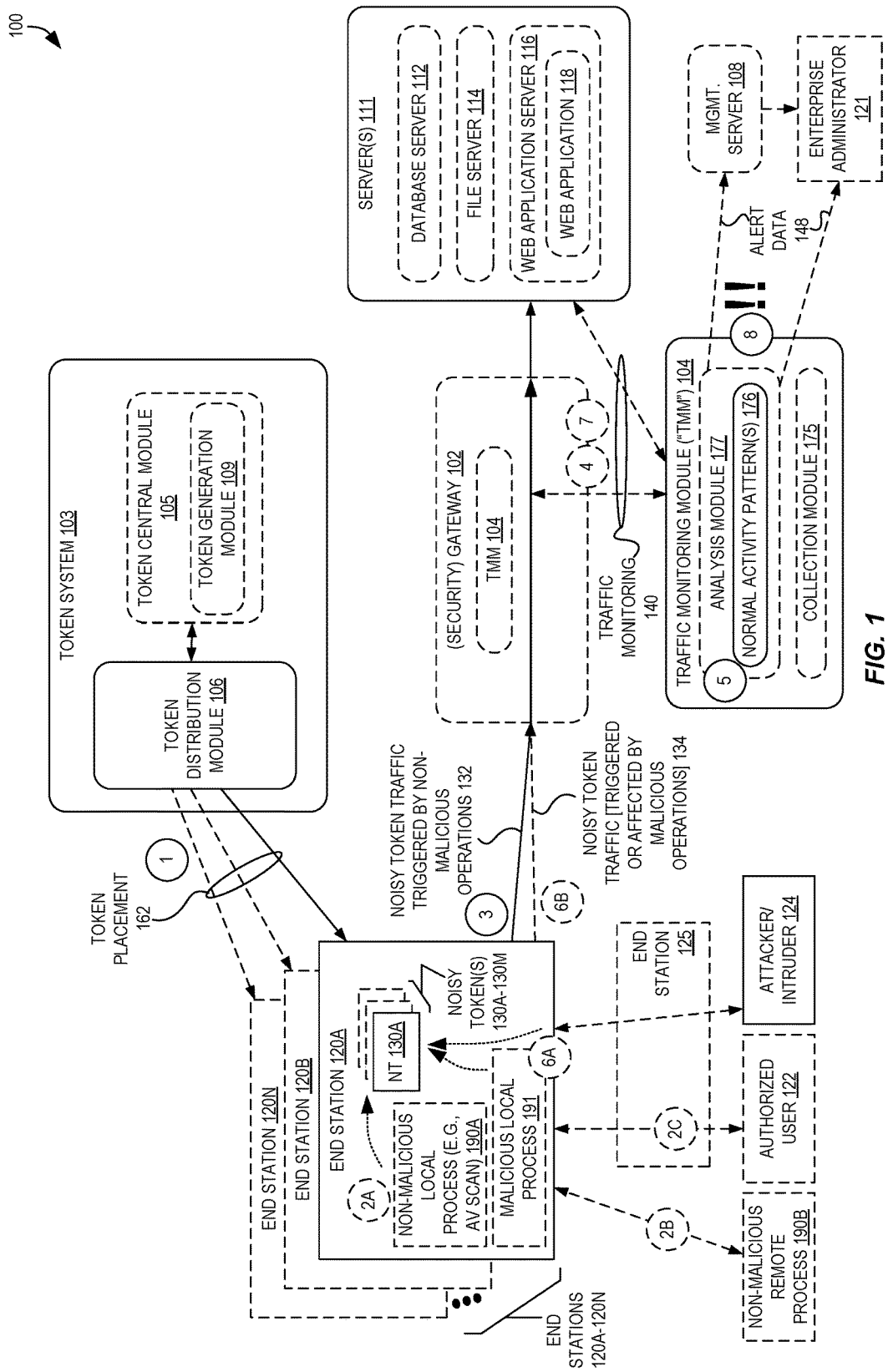
FIG. 1 is a block diagram illustrating exemplary components of a system for detecting compromises of enterprise end stations utilizing noisy tokens according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a Uniform Resource Locator (URL) is one type of Uniform Resource Identifier (URI) that points to a resource over a network (e.g., a web resource), these terms are used interchangeably herein to refer to a URI, which is a string of characters used to identify a resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

Embodiments disclosed herein provide for methods, non-transitory computer-readable storage media, systems, and apparatuses for detecting compromises of enterprise end stations utilizing noisy tokens. According to some embodiments, one or more noisy tokens can be placed at particular location(s) of an end station (e.g., client end station, server end station) such that the noisy token(s) are known to be (or known as highly likely to be) "activated" or "triggered" upon typical or routine non-malicious system operations and thus generate network traffic, while also generating network traffic upon operations of an attacker/intruder. In some embodiments, "normal" activity patterns of the network traffic resulting from non-malicious operations can be identified, thus enabling the network traffic resulting from malicious activity to be detected due to that traffic not matching any non-malicious pattern.

As described above, the term "honey token" can refer to a piece of information placed in a server data repository that is relatively easy to detect when used, and is rarely (if ever) used by an authorized user. For example, a honey token could be a user account identifier (e.g., a username) configured for a server or server end station that is not assigned to or used by any authorized user, or a database entry that would typically only be selected by a malicious query.

Further, a "reverse" honey token, unlike a traditional honey token, is not placed for discovery within a server or server end station. Instead, reverse honey tokens can be placed in client end stations (e.g., into one or more user electronic devices within an enterprise utilized by employees, for example) at locations such that the reverse honey tokens are not easily found or utilized by the authorized end users of those client end stations. Reverse honey tokens can have an apparent use at a server that is typically not hosted by or co-located with the client end station where they are placed.

Thus, both honey tokens and reverse honey tokens include seemingly valuable data/information expected to be directly obtained by a user/attacker.

A "noisy" token may be used to refer to a token (or "object") that is placed in a particular filesystem or operating system location of a device which, when accessed by processes running on that device, cause network activity to be generated. Accordingly, a noisy token can thus be "activated" (or "triggered") upon certain non-malicious operations of the device, and similarly activated upon malicious operations being performed by/at/with the device.

Noisy tokens are typically not accessed directly by a human user, but instead by an operating system component or application. For example, a noisy token may be accessed by an operating system component or application attempting to obtain an icon to be displayed to a user, generate a Most Recently Used (MRU) list to be presented to a user, perform a system maintenance task, perform an antivirus (AV) scan, or process a system event that occurred due to the action of a user. For example, a user may login to a system and in response, the operating system may execute a script (that is triggered upon such login events) that causes a noisy token to be accessed. Thus, such noisy token accesses may be referred to as being indirectly made by a user—i.e., made by an operating system component or application responsive to some user action(s).

However, in some cases noisy tokens may be directly accessed by users. For example, a noisy token could be a shortcut or symbolic link that is directly selected by a user (e.g., via a mouse click, touchscreen press, keyboard/voice command, or other user input). Although in some cases these accesses still are ultimately made by an operating system component or application, in the case of direct accesses the user is purposefully attempting to interact with the noisy token, as opposed to an operating system component or application accessing the noisy token without the user's direct knowledge. However, even when a noisy token is directly accessed by a user (or attacker), the resultant triggering of the network traffic is typically not intended by the user or known by the user as being likely to occur responsive to the access.

Accordingly, noisy tokens are designed with the intention to be deployed on end stations in such a way that local operations occurring on these end stations results in network traffic being generated, which can be directed to a configured target server using a particular target protocol and port.

Thus, network traffic resulting from the access of a noisy token can be detected by other entities or end stations in the network, and such accesses may be detected as occurring in patterns. For example, a noisy token may be activated on a regular or semi-regular basis—e.g., upon a user logging in to a machine, upon an anti-virus scan being performed, during a scheduled system backup, etc. Accordingly, based upon the network traffic resulting from these noisy tokens being accessed, embodiments can identify/detect "normal" activity patterns of the non-malicious traffic. Further, embodiments can detect when noisy token generated network traffic does not match these normal activity patterns—i.e., deviations or anomalies from these patterns—which may result from the activity of an attacker/intruder. Moreover, in some embodiments, the lack of noisy token traffic that is expected (e.g., based upon a normal activity pattern) to be observed but is not in fact observed can also be detected.

FIG. 1 is a block diagram illustrating exemplary components of a system 100 operable for detecting compromises of enterprise end stations utilizing noisy tokens according to some embodiments. FIG. 1 includes one or more servers 111, which can include one or more of a database server 112, a file server 114, and/or a web application server 116, though in other embodiments the server(s) 111 can include more, fewer, and/or different types of servers, including but not limited to print servers, mail servers, gaming servers, application servers, domain servers, etc.

A web application server 116 is system software (running on top of an operating system) executed by server hardware upon which web applications (e.g., web application 118) run. Web application servers may include a web server (e.g. Apache, Microsoft® Internet Information Server (IIS), nginx, lighttpd), which delivers web pages (or other content) upon the request of HyperText Transfer Protocol (HTTP) clients (i.e., software executing on an end station) using HTTP, and may also include an application server that executes procedures (i.e., programs, routines, scripts) of a web application 118. HTTP clients (e.g., non-illustrated software of any of end stations 120A-120N) typically interact with web applications 118 by transmitting HTTP request messages to web application servers 116, which execute portions of web applications 118 and return web application data in the form of HTTP response messages back to the HTTP clients, where the web application data may be utilized in any number of ways (e.g., rendered using a web browser, parsed and manipulated by another application).

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, Internet Protocol (IP) address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today. A new version of the HTTP protocol, HTTP/2, was standardized in 2015 and also is in common use today, being supported by many major web servers.

Database servers 112 (or database management systems (DBMSs)) are computer programs that provide database services to other computer programs or computers, typically adhering to the client-server model of communication. Database servers 112 typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column. Thus, in some instances a database server 112 may receive a Structured Query Language (SQL) query from a client (e.g., as part of a request message), execute the SQL query using data stored in the set of one or more database tables of one or more of the databases and potentially return a result (e.g., an indication of success, a value, one or more tuples, etc.).

A file server 114 is system software (e.g., running on top of an operating system, or as part of an operating system itself) typically executed by one or more server end stations (each coupled to or including one or more storage devices) that allows applications or end stations 120A-120N access to a file-system and/or files, typically allowing for the opening of files, reading of files, writing to files, and/or closing of files over a network. File servers 114 typically operate using any number of remote file-system access protocols, which allow client processes to access and/or manipulate remote files from across the Internet or within a same enterprise network (e.g., a corporate Intranet), often by sending request messages according to a protocol. Examples of remote file-system access protocols include, but are not limited to, the Network File System (NFS), WebNFS, Server Message Block (SMB)/Common Internet File System (CIFS), SAMBA, File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

The set of servers 111 (or server end stations upon which the servers 111 are implemented) may in some embodiments be "protected" by a gateway 102 (e.g., a security gateway).

Security gateways 102—such as database firewalls, file system firewalls, web application firewalls (WAFs), etc.—are network security systems that protect hardware and/or software applications (e.g., web application server 116) executing on electronic devices within a network by controlling (or monitoring) the flow of network traffic passing through the security gateway 102. By analyzing packets flowing through the security gateway 102 (and possibly determining whether those packets should be allowed to continue traveling through the network), the security gateway 102 can prevent malicious traffic from reaching a protected server, modify the malicious traffic, and/or create an alert to trigger another responsive event or notify a user of the detection of the malicious traffic. In some embodiments, the security gateway 102 is communicatively coupled between the end stations 120A-120N and the servers 111, such that all traffic destined to the servers 111 is first passed through (or made available to) the security gateway 102 for analysis.

Security gateways 102 can be deployed as "transparent" inline bridges or routers. Transparent inline bridges and routers are placed between clients and servers, but are transparent (or not visible, by not acting as an endpoint) to both the clients and servers. Thus, packets sent by a client to a server will arrive at the security gateway 102, be analyzed by the security gateway 102, and may be blocked or forwarded on to the server when the packets are deemed acceptable by the security gateway. However, in transparent security gateway deployments, a client forms a communication connection directly with the server. Security gateways 102 may also be deployed as a non-inline sniffer (see FIG. 13 non-inline sniffer 1320B) or reverse proxy or transparent proxy (see FIG. 13 reverse proxy or transparent proxy 1320C), any of which may be coupled to a switch (e.g., 1345) or other network device forwarding network traffic between the end stations 120A-120N and the server(s) 111. Further detail regarding some possible deployment configurations of security gateways 102 of some embodiments will be described further herein with regard to FIG. 13.

End stations 120A-120N (e.g., workstations, laptops, netbooks, palm tops, mobile phones, smartphones, multimedia phones, Voice Over Internet Protocol (VOIP) phones, user equipment (UE), terminals, portable media players, Global Positioning Satellite (GPS) units, gaming systems, set-top boxes) are computing devices operable to execute applications that, among other functions, can access content (e.g., enterprise data) and/or services provided by the server(s) 111. In some embodiments, the end stations 120A-120N execute applications to allow a user to create, delete, view, and/or edit user data files stored remotely (e.g., by one or more servers 111).

The end stations 120A-120N and servers 111 can—but not necessarily at all points in time—operate within a same network (e.g., a Local Area Network (LAN)) controlled and/or operated by an enterprise. An enterprise can be a business, organization, governmental body, or other collective body utilizing or providing the content and/or services of the servers 111.

Some users of the end stations 120A-120N can be deemed "enterprise users" or "authorized users" (e.g., authorized user 122). These users are explicitly or implicitly part of the enterprise. Authorized users 122, using the end stations 120A-120N, typically access content and/or services of the servers 111 from within a same network as the servers 111 or when the end stations 120A-120N are connected to the enterprise network through use of virtual private network (VPN) connections to the enterprise network overlaid on (e.g., tunneled through) the Internet.

As detailed above, intrusions into an enterprise network may seek access to enterprise data/services provided by servers 111. Such intrusions may occur through a compromised end station (e.g., 120A) that may be assigned to one or more authorized users 122, and which has been somehow accessed or controlled by an intruder 124. In some instances, the intruder 124 may have direct, physical access to the end station 120A, but in other instances, the intruder 124 may be able to connect to the end station 120A from a separate end station 125 existing either inside or outside the LAN. For example, the intruder 124 may be granted access to the end station 120A when an authorized user 122 accesses a malicious webpage (via the end station 120A) causing a malicious program or code (i.e., "malware") to be executed by the end station 120A, resulting in a malicious local process 191 being executed. For example, the authorized user 122, using a web browser of the end station 120A, may load a web page hosting an "exploit kit" that subjects the end station 120A to one or more attacks (e.g., that attempt to install malware) against the web browser or other software that the web browser can invoke, such as a third party document viewer or multimedia player, or may attempt to lure the authorized user 122 into surreptitiously allowing or causing the malware to be installed to the end station 120A. With access to the compromised end station 120A, the intruder 124 may then attempt to access enterprise data of the enterprise (from, for example, the database server 112, file server 114, and/or web application server 116) using information and/or credentials granted to the end station 120A or authorized user 122 that is stored on the end station 120A.

In some embodiments utilizing noisy tokens, the nature of the end station 120A as having been compromised can be detected so that the enterprise data of the server(s) 111 may be protected, the compromised end station 120A can be watched or fixed, the intruder 124 can be removed from the network and/or caught, etc.

To this end, some embodiments utilize one or more of the following modules: a token distribution module 106 ("TDM"), a token central module 105, a management server 108, and/or a traffic monitoring module 104 ("TMM"). These modules 104-108, in various embodiments, may be implemented with software, hardware, or a combination of both. In some embodiments, the token central module 105 and/or management server 108 can be part of a server end station (depicted in FIG. 13 as management server end station 1360), and the token distribution module 106 can be part of a separate server end station (depicted in FIG. 13 as network management server end station 1355). However, modules 104-108 may be implemented in a variety of configurations, including implementing each module 104-108 using a separate electronic device, all of the modules 104-108 by just one electronic device, or implementing some (but not all) of the modules 104-108 by a particular electronic device. In some embodiments, one or more of the token distribution module 106, token central module 105, and/or management server 108 may collectively form a token system 103.

The token central module 105 can be configured to generate one or more noisy tokens 130A-130M via a token generation module 109. These noisy tokens 130A-130M can ultimately be placed within one or more devices (e.g., end stations 120A-120N), which can be client end stations, server end stations, etc. In some embodiments, the noisy tokens 130A-130M are placed in particular file system and/or operating system (O/S) locations such that the tokens are triggered (or highly likely to be triggered) by some non-malicious operations.

Throughout this description, the use of a letter character at the end of a reference numeral (corresponding to an illustrated entity) is not meant to indicate that any particular number of that entity must necessarily exist, but merely that the entity is one of potentially many similar entities. For example, noisy token(s) 130A-130M include both "A" and "M" letter suffixes, which means that there could be two noisy tokens, three noisy tokens, etc. (Moreover, the use of dashed lines for some of the noisy token(s) 130A-130M, as described above, indicates that those could be optional; thus, in some embodiments only one noisy token 103A may be placed upon end station 120A.) Additionally, the use of different letter characters as reference suffixes for different entities is not meant to indicate that there must be different numbers of these entities. For example, although the end station(s) 120A-120N and the noisy token(s) 130A-130M include different letter suffixes—i.e., "N" and "M"—there could be the same number (or different numbers) of end stations and noisy tokens in various embodiments.

In the embodiment depicted in FIG. 1, a generated noisy token is provided to the token distribution module 106, which operates to, at circle '1', place the noisy token on one or more of the end stations 120A-120N via token placement commands 162. In FIG. 1, the circled numbers are used to denote one exemplary order/sequence of operations performed in some embodiments. It is to be understood that in other embodiments, more, fewer, or different operations can be performed, and that these operations can be performed in a different order.

In some embodiments, the token distribution module 106 includes a server module to generate and distribute Windows® Active Directory Group Policy Objects (GPO) including the noisy tokens, which are pushed out to the end stations 120A-120N (e.g., during a login or logout, according to a schedule, or at some other point) as token placement commands 162. For example, a GPO may comprise a script that, when pushed to and executed by an end station 120A, places a noisy token 130A on the end station 120A. In other embodiments, the token distribution module 106 may include a Microsoft® System Center Configuration Manager (SCCM) component, an IBM® Tivoli® component, or another enterprise end station management software package.

In some embodiments, the placement and/or composition of the noisy tokens 130A-130M will not introduce any unintended side effects to the operation of the end stations 120 (e.g., misconfigurations, errors, etc.) and thus the system can be easily deployed in an enterprise without affecting any of its users.

In some embodiments, the token system 103 can be configured to "refresh" deployed noisy tokens. For example, based upon an occurrence of a date/time/event, the token distribution module 106 can maintain the noisy token scheme, which can include causing a redistribution of the same noisy tokens 130A-130M as before, which ensures the availability/existence of noisy tokens 130A-130M on the end stations 120A-120N, as the earlier noisy tokens 130A-130M could have been moved, modified, or deleted by an authorized user 122. In some embodiments, this maintenance includes causing a distribution of additional and/or replacement noisy tokens that are different than the earlier-placed noisy tokens 130A-130M.

However, after the one or more noisy tokens 130A-130M have been placed (or "installed") on one or more of the end stations 120A-120N, at circle '2' "normal" or non-malicious operations occur at one or more of the end stations 120A-120N that activate one or more of the noisy tokens 130. The non-malicious operations can result from an authorized user 122 utilizing the end station 120A (at circle '2A'), a non-malicious local process 190A (at circle '2A'), or a non-malicious remote process 190B (at circle '2B'). For example, these non-malicious operations could include one or more of an AV scan being performed by AV software, a system backup being performed, a user login occurring, a user opening an application, etc. Thus, these non-malicious operations result in an activation of one or more of the noisy tokens 130A-130M, which results in, at circle '3', noisy token traffic 132 being transmitted. In this example, the noisy token traffic 132 (resulting from non-malicious operations) is destined toward one (or more) of server(s) 111. These non-malicious operations may occur one or multiple times over any amount of time, such as minutes, hours, days, weeks, etc.

At circle '4', the TMM 104 can monitor 140 the network traffic 132 using its collection module 175, which can occur in a variety of different ways.

For example, the TMM 104 can be deployed within an enterprise security gateway 102, where the network traffic passes to/through the enterprise security gateway 102. Thus, the TMM 104 can thus detect network traffic resulting from noisy tokens being triggered that is directed toward the server(s) 111. This noisy token traffic 132 may or may not be passed on to reach the server(s) 111.

In some embodiments, the TMM 104 can be deployed in a cloud security gateway of a cloud computing system, which can be configured to provide access to enterprise resources provided/hosted by another cloud computing system (e.g., of a third-party entity) or by the same cloud computing system. Accordingly, in some embodiments the TMM 104 can detect the network traffic resulting from non-malicious and/or malicious operations as it flows through the cloud security gateway.

Additionally, in some embodiments, the TMM 104 can "indirectly" monitor the noisy token traffic 132. For example, the TMM 104 can be configured to interact with the servers 111 providing enterprise resources to learn about the traffic 132. Thus, in some embodiments, the TMM 104 can detect network traffic that results from noisy tokens being triggered without needing to directly be in the path (or directly observe) the network traffic. In some embodiments, the TMM 104 can poll another system/server (e.g., periodically send requests) to collect such noisy token network traffic data (e.g., access records/logs from the server(s) 111), and in some embodiments, the TMM 104 can receive (or otherwise acquire) access record data generated by the server(s) 111 or by other sensors (e.g., the security gateway 102).

With this network traffic data, the analysis module 177 of the TMM 104 can (at circle '5') analyze the monitored network traffic to determine normal activity patterns 176 within the network traffic resulting from non-malicious operations. For example, the analysis module 177 may utilize one or more machine learning/data mining techniques to identify normal (or "regular" and thus "non-malicious") activity patterns 176 of the network traffic.

In some embodiments, the analysis module 177 may obtain access records where all (or nearly all) of the records are from noisy token traffic (as opposed to "regular" traffic of the network). For example, in some embodiments the noisy tokens 130A-130M are configured to cause traffic to be sent to a particular network address, port, etc., that is not used by other typical (or "legitimate") traffic, and thus all (or substantially all) such traffic should be noisy token traffic. Additionally or alternatively, the analysis module 177 can be configured to identify traffic generated by noisy token accesses, which can include looking for unique characteristics (e.g., network addresses, ports, unique identifiers with data/payloads, etc.) of the noisy token traffic that legitimate traffic will not have. Thus, the analysis module 177 might be provided (or have access to) only noisy token traffic, or might be provided (or have access to) a mix of both noisy token traffic and regular legitimate network traffic and then identify (e.g., by filtering) the noisy token traffic.

Using this noisy token traffic, the analysis module 177 can use, for example, one (or more) of any number of supervised, unsupervised, and/or semi-supervised machine learning algorithms that are well-known to those of skill in the art to identify patterns in this network activity. Thus, the particular algorithm(s) implemented to detect these patterns is not material. This learning can occur, in some embodiments, in a separate learning phase, but in other embodiments the learning can be continual (i.e., with a never-ending learning phase) or semi-continual (i.e., with multiple learning phases).

In various environments and embodiments, the machine learning algorithm(s) utilized by the analysis module 177 can be configured with different confidence thresholds required to cause a generated "candidate" pattern to be included as one of the normal activity patterns 176. For example, in some environments, a high confidence threshold can be set so that only patterns that are very "strong" (i.e., observed to be highly regular/repetitive) are included, which may lead to more malicious traffic being detected (i.e., more recall of malicious traffic), but at the same time allowing more non-malicious traffic to be deemed possibly malicious (i.e., having lower precision).

Conversely, the alternative can also be implemented depending upon the particular environment, where a lower confidence threshold can be set so that slightly-less strong patterns are included as normal activity patterns 176, which may lead to less malicious traffic being detected (i.e., having lower recall of malicious traffic), but at the same time allowing less non-malicious traffic being deemed as being possibly malicious (i.e., having higher precision).

However, it has been observed that over time in most environments, normal activity patterns 176 can be continually updated, added, removed, etc., so that the set of normal activity patterns 176 will eventually have both high precision and high recall.

At some point, at circle '6A' an attacker/intruder 124 may access/control one or more of the end stations (e.g., end station 120A), which may optionally cause noisy token traffic 134 to be transmitted toward one or more of the server(s) 111 (at circle '6B').

In some scenarios, as described earlier herein, the intruder 124 may have physical access to the end station 120A, or may access the end station 120A using another device (e.g., end station 125 owned or controlled/operated by the intruder 124, as opposed to an end station 120A-120N owned or operated by the enterprise). In some scenarios, the intruder 124 is able to interact with the end station 120A—perhaps by remotely sending commands to it and receiving output in response—but in other scenarios, the intruder 124 may simply receive some output from the end station 120A, such as data that has been "harvested" by a piece of malware (e.g., malicious local process 191) executed by the end station 120A. In cases where the intruder 124 has physical access to the end station 120A, he or she may simply utilize the input/output (I/O) interfaces of the end station 120A.

The intruder 124 may then (inadvertently) cause one or more of the noisy tokens 130A-130M to be activated in a variety of ways, such as by attempting to examine data files of the end station 120A (e.g., word processing documents, images, videos, plaintext files, spreadsheets, user databases, emails, etc.) in an attempt to discover sensitive or valuable data, performing a search for information (e.g., searching for data that may include valuable information or appear likely to include valuable information), browsing the file system, or performing other seemingly benign actions.

Additionally or alternatively, the presence of the intruder 124 may cause "non-malicious" noisy token traffic to not be observed by the TMM 104 (e.g., to not arrive at a destination server 111, or to arrive in an unexpected state or at an unexpected time). For example, the intruder 124 may carry out an attack within the network causing certain network traffic to be modified or redirected (or not sent at all), such as via a Man-in-the-Middle (MITM) attack, a spoofing attack, a proxy attack, etc., as discussed later herein.

Accordingly, at circle '7', the TMM 104 can monitor the network traffic 132/134, and perform one or more analyses to determine whether all of the network traffic belongs to a normal activity pattern 176, whether certain traffic (corresponding to a normal activity pattern 176) that is expected to arrive actually does arrive, etc.

At some point, the TMM 104 may determine that an anomaly exists—e.g., that some noisy token traffic arrives that is not part of known normal activity pattern 176 resulting from known non-malicious operations, that expected noisy token traffic does not properly arrive, etc. At this point, at circle '8' the TMM 104 can be configured to generate an alert (e.g., send alert data 148 to an enterprise network administrator 121 or management server 108 (which may then notify an enterprise network administrator 121), etc.).

Generating the alert data 148 may also comprise, depending upon configuration, causing one or more actions to be performed, including but not limited to blocking certain network traffic, sending a notification message to an administrative user (e.g., enterprise network administrator 121) or other user, sending a notification message to one or more security gateways 102, one or more management servers 108, and/or one or more of the servers 111, which may enable those recipients to implement further security protections against the intruder 124. In some embodiments, the generating of the alert data 148 may also comprise implementing a security rule (e.g., at secure gateway 102) to place further traffic received from the source of the anomaly-causing network traffic under heightened scrutiny (e.g., closely monitoring all traffic from an IP address).

Figure 2:
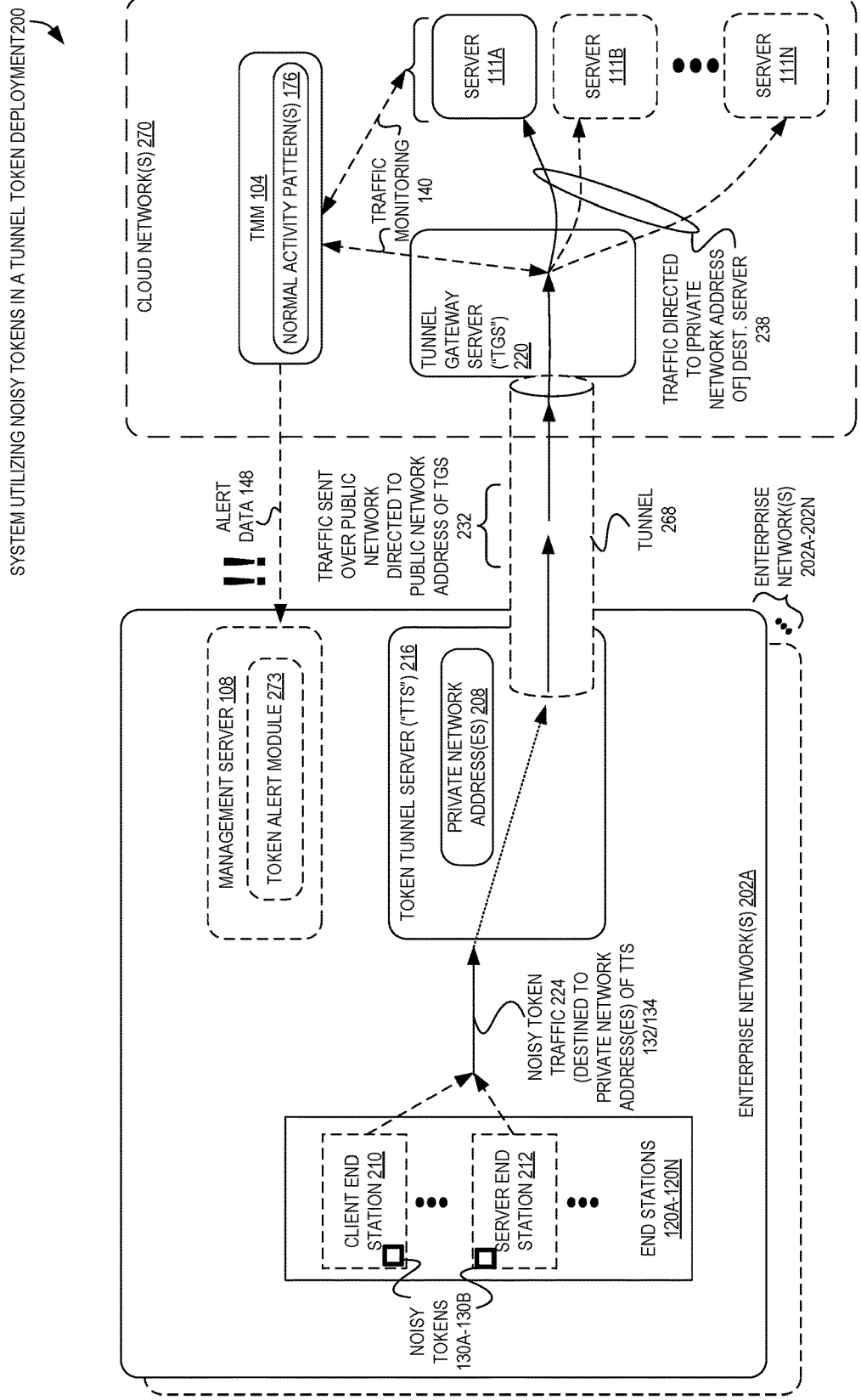
FIG. 2 is a block diagram illustrating an exemplary system for detecting compromises of enterprise end stations utilizing noisy tokens with a tunnel tokens configuration according to some embodiments.

Although the server(s) 111 and/or TMM 104 can be placed within the enterprise network along with the end stations 120A-120N, in some embodiments the server(s) 111 and/or TMM 104 can be located outside of the enterprise network. For example, embodiments can utilize noisy tokens within the context of a "tunnel tokens" configuration. FIG. 2 is a block diagram illustrating an exemplary system 200 for detecting compromises of enterprise end stations (e.g., client end station 210, server end station 212, etc.) utilizing noisy tokens under a tunnel tokens configuration according to some embodiments.

In some embodiments, server(s) 111A-111N can be hosted separately/remotely from an enterprise network 202A that the end station(s) 120A-120N operate within. These servers 111 can be the target of network traffic 132/134 originated by the triggering of placed noisy tokens 130A-130M, and can be accessed via a private network address of (i.e., one belonging to, or appearing to belong to) the enterprise network 202A.

Accordingly, an activation of a noisy token 130A by a non-malicious or malicious operation can lead to traffic 224 to be directed within the enterprise network 202A to a private network address 208 of a token tunnel server ("TTS") 216. The TTS 216, which is located within the enterprise network 202A, can pass the traffic 224 over a public network (e.g., the Internet, possibly using a tunnel 268) as traffic 232 to a public network address (e.g., a routable IPv4 or IPv6 address) of a Tunnel Gateway Server ("TGS") 220, which may be part of one or more cloud networks 270. The TGS 220 may then provide the traffic 238 to one of the server(s) 111A-111N. The recipient server(s) 111A-111N can also respond to the traffic via the same path—e.g., via response traffic sent back to the TGS 220, through the tunnel 268 (or other network connection/path), to the TTS 216, and back to the particular end station 120A. In some embodiments, the tunnel 168 may be an IPSec tunnel, Generic Routing Encapsulation (GRE) tunnel, etc., though in other embodiments it may be "plain" Transmission Control Protocol (TCP)/Internet Protocol (IP)—i.e., TCP/IP.

In some embodiments, this traffic 238 sent by the TGS 220 (as well as response traffic, when utilized) can be monitored by the TMM 104 as described above, which can be configured using normal activity patterns 176 to identify potentially malicious traffic (as described herein) and provide alert data 148 back to the enterprise network 202A (e.g., to a token alert module 273 of a management server 108) or another location, which can further cause the generation of an alert (e.g., by the management server 108). This alert (or the alert data 148) can be of a variety of types known to those of skill in the art, including the sending of an electronic message (e.g., email, Short Message Service (SMS), instant message, etc.) or otherwise causing a particular enterprise user to be notified (e.g., via voice message, via a web or application interface, etc.), launching additional network security measures (e.g., increasing an amount of logging of traffic/devices associated with or utilized by an attacker (such as a remote access gateway, client end station, server end station, etc.), blocking traffic associated with the attacker or end station 120, etc.).

Notably, in some embodiments using a "tunnel tokens" configuration, the system can support an unlimited variety of protocols (i.e., not be limited to protocols supported by activity monitoring products), utilize a simple and stable on premise component (e.g., TTS 216) that is easy to deploy into an enterprise network 202A and may require no changes for adding new protocols or new detection algorithms, is decoupled from any existing activity monitoring deployments/products of the enterprise, allow agile development allowing for the rapid introduction of experimental tokens and detection algorithms, and not affect any existing token distribution mechanisms.

Noisy Token Types and Placements

As discussed earlier, noisy tokens can be thought of as artifacts that are planted on end stations inside an enterprise network, such as desktop computers, laptops, servers, mobile devices, tablets, etc. In some embodiments, noisy tokens are designed with the intention to be deployed on end stations in such a way that local operations on these end stations generate network "noise"—i.e., network traffic. For example, in some embodiments local operations involving noisy tokens generate traffic to a configurable target server using a target protocol and port. This traffic can allow for normal activity patterns to be generated that characterize the occurrence(s) of the network noise generated from those end stations that had these noisy tokens deployed upon them. Thereafter, network traffic can be gathered (e.g., by the collection module 175 of the TMM 104) and analyzed with regard to the normal activity patterns (e.g., using analysis module 177 of the TMM 104) to identify deviations from these regular (or non-malicious) patterns.

Noisy tokens can take many forms. A noisy token can be defined by its type, location within the end station, the target server, and/or the target protocol. Noisy tokens, in many embodiments, are crafted and placed such that they do not interfere with the use of the end stations—e.g., other applications and/or O/S processes.

As one example, some noisy tokens can be symbolic links. Symbolic links are similar to file "pointers" as they point to another file that could be local or remote, or could even point to another symbolic link. Operations performed on the local symbolic link (e.g., read, write, open, etc.) can be translated to operations to be performed on the "pointed to" file. Thus, symbolic links to remote files can generate network traffic which can be observed.

Because of the characteristics of symbolic links, processes that routinely perform file operations on a group of files that includes the one or more noisy tokens will trigger network traffic from these tokens. A few common examples include an AV scan, a system backup process, etc.

Similar to files, symbolic links can be placed in any folder/directory inside the end station. Further, dependent upon the target path, a symbolic link can generate a variety of types of traffic, such as CIFS, HTTP(S), or FTP traffic. For example, the following target path may generate CIFS traffic towards the target server using the calling process' domain credentials:

"[\\<target server name>\<share name>\<file name>"

Similarly, the following path may be used to generate HTTP traffic towards a target web server (due to the presence of the "DavWWWRoot" keyword, indicating that a WebDAV server is being targeted), again using the calling process' domain credentials:

"[\\<target server name>\DavWWWRoot\<somepath>"

Similar to symbolic links, in some embodiments, noisy tokens can be shortcuts. Shortcuts are files that contain a pointer (or a link) to a local or more importantly, a remote file. A process needs to actively follow the link in order to retrieve the remote file and thus, to generate the network noise (as opposed to symbolic links, which do not need to be actively "opened"). One example would be a Windows® ".lnk" file. Like any other file, shortcuts are files, and can be placed within any folder inside the end stations. Additionally, depending upon the target path, a shortcut can generate CIFS, HTTP(S), or FTP traffic. To generate HTTP traffic, for example, the target path can include the "http://" prefix, where one simple example is:

http://<target server>/path.html

To generate FTP traffic, the target path can include "ftp://" prefix, where one simple example is:

ftp://<target server>/filename.txt

Figure 3:
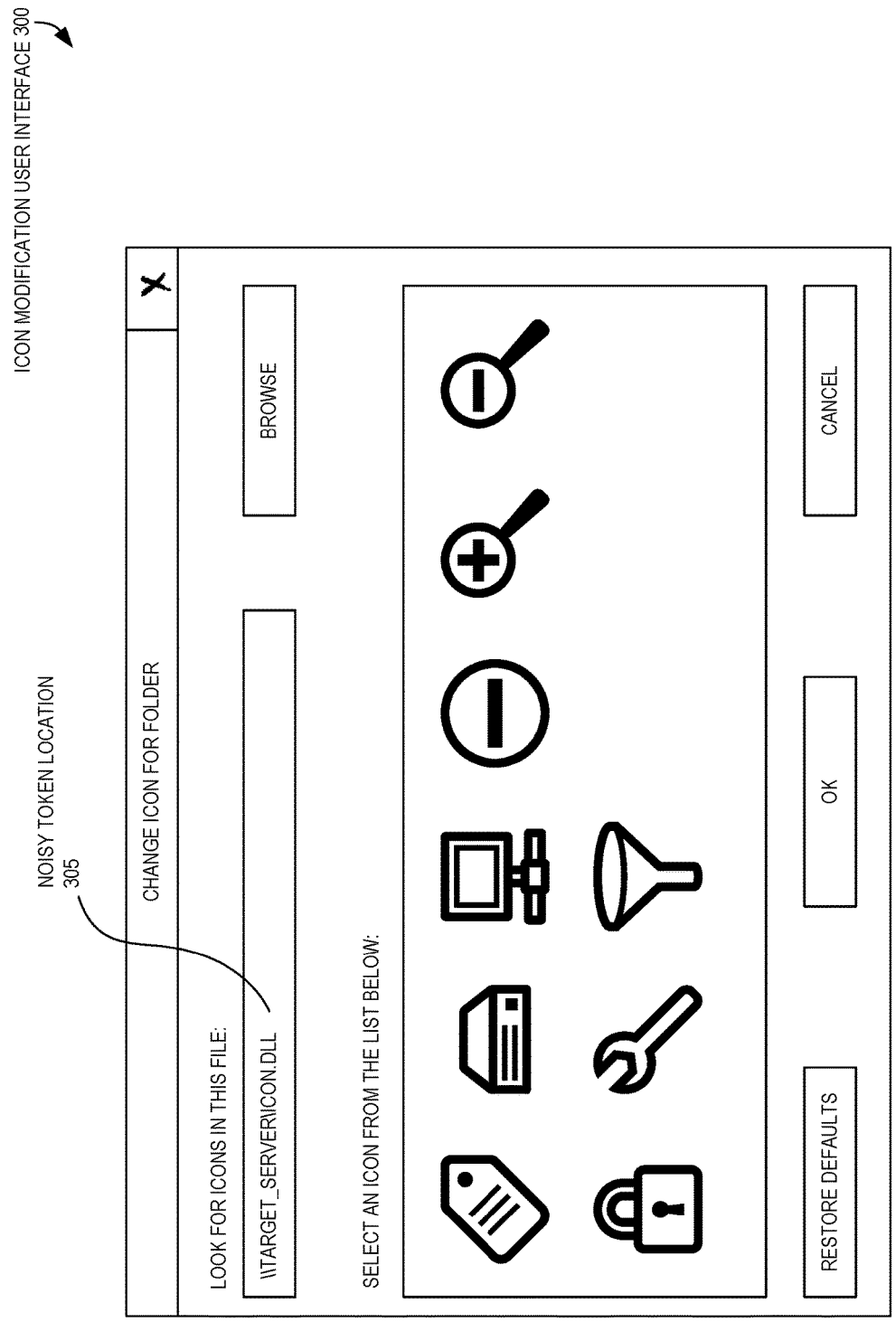
FIG. 3 is a diagram illustrating an icon modification user interface according to some embodiments.

Another type of noisy token that can be utilized in some embodiments is icons. Icons are artifacts that generate traffic when a process attempts to display an icon for a file or folder, usually to another process having a Graphical User Interface (GUI), such as Explorer in various versions of the Microsoft Windows O/S. When an icon points to a remote path, the display operation (i.e., displaying the icon) will result in traffic being generated on the network to retrieve the icon. For the purpose of understanding, in Windows systems the icon path can be configured using a GUI within Windows as illustrated in FIG. 3, although the icon path can easily be configured by commands without the use of GUIs. FIG. 3 is a diagram illustrating an icon modification GUI 300 according to some embodiments. In this figure, the icon modification GUI 300 displayed allows a user to provide/select a path (or noisy token location 305) of a file that includes one or more icons. Accordingly, this path can be set to point to a remote location, which will cause network traffic to be generated. Again, although this user-facing GUI 300 is presented, some embodiments will not directly utilize such a GUI, as the path for an icon can be set programmatically (i.e., without user input via a keyboard, mouse, etc.) via a script, commands, etc. Thus, this figure is included to assist in providing understanding of icons pointing to a remote resource using a noisy token location 305.

Icons can be placed wherever their containing file resides. In the case of shortcut icons, for example, it can be anywhere in most file systems. Also, similar to shortcuts, the target path of the file can affect the protocol used, which can be CIFS, HTTP(S), FTP, etc. To generate HTTP traffic, for example, the target path may look similar to:

http://<target server>/icon.html

To generate FTP traffic, the target path may look similar to: ftp://<target server>/filename.txt Another "type" of noisy token that can be utilized is logon tokens, which can be used to identify which domain accounts are performing logon/logoffs from which end stations.

For example, some embodiments use "Registry" logon tokens, which can be a symbolic link or set of one or more batch commands that are placed inside a Registry entry of a Windows® end station. For example, inside a registry item (e.g., HKEY_LOCAL_MACHINE\Software\Microsoft\Windows\CurrentVersion\Run), a path can be inserted to a local symbolic link file that points to a target server. Thus, each new successful interactive logon will attempt to retrieve the remote file pointed to by the symbolic link, causing network traffic.

Alternatively or additionally, one or more batch commands can be entered inside a Registry item that will write information about the logon to a remote file share. For example, the following batch command could be utilized:

cmd /V /c echo %computername%,%username%<target server>\shared\%computername%.txt"

Another type of logon token can be Windows Management Instrumentation (WMI) logon tokens. WMI logon tokens can be used to register specially-crafted scripts that are executed whenever a specific type of event occurs. One technique to create a noisy token for logons is to register on the WMI Win32_LogonSession event. When a new logon occurs, this event is triggered, causing the crafted script to be executed—which can be used to register which account performed the logon and to which end station, for example.

The location for logon token placement can be restricted based upon their type. For example, there may be a few specific registry entries that can be used for logon tokens. Further, WMI entries are not located on the file system. Additionally, because logon tokens can execute a batch command or a script once a logon occurs, there is no limit on the number or types of protocols that can be used.

Another type of noisy token that can be utilized is a Most Recently Used (MRU) entry. MRU entries are a collection of paths that were recently accessed from an application. Thus, MRU noisy tokens are tokens that are inserted/placed amongst such entries of widely-used applications. These entries are normally accessed by scanners (such as AV software), leading to the generation of network noise. Further, attackers may also open applications and examine MRU entries when performing network reconnaissance, also generating network noise.

As an example, the URLs that were typed in Internet Explorer's navigation bar can be found in the registry of a Windows O/S at:

HKEY_CURRENT_USER\Software\Microsoft\Internet Explorer\TypedURLs

In some embodiments, Office MRU entry noisy tokens can be utilized. Office MRU entries are a set of files that were recently viewed by Microsoft Office applications such as Word, Excel, etc., and can be accessed inside the Windows Registry, though their precise location depends upon the particular version of Windows and/or Office installed. For example, the following are a few exemplary locations for Office MRU entry noisy token placement:

Word: "HKEY_CURRENT_USER\Software\Microsoft\Office\14.0\Word\File MRU"

Excel: "HKEY_CURRENT_USER\Software\Microsoft\Office\14.0\Excel\File MRU"

Another type of MRU noisy token that can be used includes "Run MRU" noisy tokens. Run MRU entries are created for every file or path accessed from the Windows "Run" command. These entries can be located inside the registry, for example at:

"HKEY_CURRENT_USER\Software\Microsoft\Windows\CurrentVersion\Explorer\RunMRU"

Regarding the placement of MRU noisy tokens, each MRU entry location is dependent of its type. Additionally, the target server and protocol of each MRU entry is dependent on the application that utilizes these entries. In the above provided examples, Office MRUs will correlate to CIFS target servers, while Explorer and Run MRUs can correlate to HTTP(s), FTP and/or CIFS.

Of course, the preceding noisy token types represent a few possibilities that can be utilized, and other types are also possible that can be derivable by those of skill in the art.

By deploying various types of noisy tokens in different locations on enterprise end stations, embodiments can impose network noise with predictable patterns that can be captured by sensors. By continuously monitoring this network noise, embodiments are able to learn which patterns are expected from which end stations, and also observe when deviations from these patterns occur. These deviations are often indicators of anomalies that occur on one or more of the end stations, and may represent the actions of an attacker/intruder, compromised insider, etc.

The following subsections give a few examples of some particular applications of noisy tokens. Of course, many additional applications utilizing noisy token techniques exist, and thus, these examples are just that—exemplary.

As mentioned above, different types of noisy tokens translate different types of local operations into network noise. By controlling the local deployment of tokens, and the target server and target protocol, embodiments can distinguish different types of operations that were performed locally by the end stations.

As an example, symbolic links can cause the type of local operation performed on the local file to be translated on the network. Accordingly, embodiments can learn which operations occur to which tokens for a particular domain account, and when these operations change. For example, "open" and "read" operations can be triggered from noisy tokens, e.g., due to AV scans. However, when an end station has its hard drive wiped, for example, embodiments may detect a noisy token that triggers a "delete" operation for this end station for the first time.

As another example, by observing network noise over time, embodiments can determine the schedule or frequency of certain events. For example, there are many tasks that are configured to occur at a certain time or when a certain amount of time has passed on an end station or for a user account (i.e., a subset of domain account). Some of these tasks can cause the triggering of noisy tokens. When a known pattern of network noise is expected to emerge from the deployment of noisy tokens, the aggregation of all the end stations inside the network can provide a clear picture of when these patterns are expected to emerge inside the network, and how long they take (e.g., on average, per domain account). Deviations from these patterns can thus be detected.

Additionally, in some embodiments noisy logon tokens can be used to determine when user accounts normally log on to the network. By learning the typical work days and work hours of user accounts, embodiments can detect when a user account perform a logon outside these hours, which could be indicative of an attack (e.g., due to stolen credentials, or a compromised insider performing malicious operations outside of work hours).

As another example, by deploying multiple noisy tokens in a single location (e.g., a same folder, or same registry entry) and in a particular order on an end station, and by observing the resultant network noise over time, embodiments can determine when processes are performing a scan of a particular location, as opposed to when a token is directly accessed (e.g., by an attacker looking for information). Thus, when embodiments detect network noise from an end station that does not match the order in which the tokens were deployed, it can be concluded that a new process accessed these tokens or that tokens were accessed intentionally (manually, perhaps by an attacker/intruder).

Further, in some embodiments, several MRU entries can be placed in a single location (e.g., several Run MRU entries inside the Windows registry). By planting multiple entries, embodiments can detect whether these entries are scanned according to their place inside the MRU list, or whether they were accessed directly (e.g., by an attacker).

Another technique for distinguishing automated (non-malicious) scans from direct, potentially-malicious accesses includes placing several noisy tokens in consecutive directories (e.g., consecutively ordered by name). Accordingly, embodiments can determine the usual order in which these tokens are scanned on an end station, and easily distinguish whether a single token was accessed directly or whether a never-seen-before process is accessing these files. For example, consider the following exemplary file system hierarchy of an end station and the symbolic link (or "symlink") noisy tokens placed inside in a consecutive manner:

Parent Dir
  TokenFolder1
    Passwords1.txt (symlink)
    userdata.txt (symlink)
    Passwords2.txt (symlink)
  TokenFolder2
    Passwords1.txt (symlink)
    userdata.txt (symlink)
    Passwords2.txt (symlink)
  TokenFolder3
    Passwords1.txt (symlink)
    userdata.txt (symlink)
    Passwords2.txt (symlink)

In this scenario, an AV scanner may access these files by their respective folder and file names, one after another. If someone is using another mechanism to access files, for example searching and reading all "passwords" related files on an end station, embodiments will detect that only one or more of the "passwords" files triggered (e.g., Passwords1.txt or Passwords2.txt) without the accesses to any of the "userdata.txt" files.

As another example, the network noise generated from noisy tokens deployed on end stations can help determine the expected origination of network noise for various domain accounts (e.g., user accounts, computer accounts). This network noise can be used to learn expected originating addresses of domain accounts—such as IP addresses and Media Access Control (MAC) addresses.

Additionally, spoofing and man-in-the-Middle (MITM) attacks (which are often performed together) occur when a malicious actor inside a network is misusing routing protocols to receive connections that are not intended to him/her. For example, an end station trying to connect to "server1" may broadcast a request over the network asking who "server1" is. A malicious actor may try to respond to this request with his/her own address, making the end station connect to the malicious actors' end station instead of the actual requested "server1". The attacker may then choose to perform a MITM attack (i.e., by propagating the connection to the original server1) or try to steal credentials from the original connection using basic authentication or other social engineering schemes.

To demonstrate how embodiments can detect a spoofing attack, consider a target server with the properties where "Host Name" is "Server1" and the "Host IP" is 192.168.1.17.

Now, consider the following noisy tokens placed on an end station inside the network:
Symbolic Link mylink1: \\Server1\Shared\file1.txt
Symbolic Link mylink2: \\192.168.1.17\Shared\file2.txt
Symbolic Link mylink3: \\Server1\DavWWWRoot\file3.txt
Symbolic Link mylink4: \\192.168.1.17\DavWWWRoot\file4.txt Additionally, assume that the end station upon which the noisy tokens are placed has the following characteristics: the logged on user account is "victim1", the computer account is "machine1$", and the IP address is 192.168.2.16.

When an attacker performs spoofing, traffic generated from the noisy tokens would be redirected to the attacker's machine. Thus, by continuously monitoring noisy token activity originating from the same network group (such as a subnet, LAN, switch, etc.) or simply originating from a single domain account or network location, embodiments can determine when this activity is reduced (e.g., for the entire subnet, for a particular domain account) for specific tokens or for all of the tokens.

In this example, if mylink2 & mylink4 are triggered from machine1$ or victim1, but the others are not triggered over a short period of time, it suggests that an attacker may be spoofing "server1" responses because only tokens that pointed to IPs were triggered, but not those that used the server name.

Another example would be a sudden decrease in the activity of all tokens from endpoints found on a particular LAN, which may suggest that an attacker is not only spoofing host names, but also managed to spoof his IP (e.g., by performing Address Resolution Protocol (ARP) poisoning).

Additionally, by monitoring noisy tokens (such as the ones described above), embodiments can determine which end stations are assigned to which IPs based on their machine account. For example, a machine1$ account that performs a connection to "\\Server1\Shared\file1.txt" from the IP address "192.168.2.16" means that this is the IP assigned to machine1 end station.

Accordingly, when a MITM attack is performed, a sudden change of several end stations' origin IP would occur to a new address (i.e., the attacker's IP address), because the attacker may have spoofed responses to the noisy tokens traffic and redirected the traffic back to the original server (i.e., server1). Thus, when one or more user accounts suddenly begin connecting to server1 from the same origin IP, embodiments can detect that a MITM attack is taking place.

Additionally, embodiments can detect an attacker implementing a proxy. Some attack vectors may configure a compromised machine to be used as proxy by other end stations. For example, in Web Proxy Auto-Discovery (WPAD) spoofing, a compromised end station responds to another end station's WPAD proxy queries with its own IP as the proxy to be used. In the above example, if traffic for account machine1$ (or victim1) to mylink1 & mylink2 have a different originating IP addresses than mylink3 & mylink4 (because they are directed at CIFS and not HTTP), embodiments can determine that machine1 (or victim1 account) is being proxied through the origin IPs of mylink3 & mylink4.

Additionally, by pointing tokens to additional server(s), inside and/or outside the network, embodiments can better determine the proxy used by end stations or user accounts when accessing an internal resource, external resource or a resource in a different subnet/subdomain or location inside the network.

As another example, noisy tokens can be utilized for correlating the logged-on user account to a specific computer account. By monitoring these logon events over time, and observing the originating address from which they occur, embodiments are able to detect (1) end station sharing—whether multiple user accounts log on to the same computer account, and/or (2) when domain accounts logon from a new network location (e.g., a new IP address, within a new LAN, a new subnet, a different domain, etc.) Such occurrences can be indicative of malicious activity, and can be detected as deviations from one or more normal activity patterns.

In some embodiments, "meta noise" resulting from the triggering of noisy tokens can be observed and analyzed to aid in profiling domain accounts (including end stations and/or user accounts) inside the enterprise network. As used herein, the term "meta noise" is used to refer to information about the source(s) of network traffic that was generated based upon the non-malicious triggering of one or more noisy tokens. This source information can relate to a domain account utilized to send the network traffic, a client end station that sends the network traffic, etc.

Regardless of the particular type of noisy token used, the traffic it generates can contain valuable information about the involved domain accounts. For example, embodiments can continuously learn accounts' originating addresses (e.g., IP address, MAC address), a mapping of computer accounts to IP addresses, a mapping of user accounts to IP addresses (and possibly then to computer accounts), the particular type of authentication method used by accounts (e.g., Kerberos, NT LAN Manager (NTLM)), the target protocol (e.g., SMB, CIFS, HTTP(S), FTP) and version used, the O/S fingerprint based on the IP connection (various methods are known to those of skill in the art that can fingerprint an O/S, e.g., based on traits of a TCP connection), etc. Accordingly, embodiments can use this information gained from the analysis of meta noise to detect deviations from learned behavior of various domain accounts.

For example, domain accounts are generally expected to use consistent authentication methods and versions when interacting with various servers. By analyzing meta noise, embodiments can determine what are the expected characteristics for each domain account, and detect when these characteristics deviate from what has previously been seen, which may suggest that an unknown process was used to trigger the token.

As another example, some embodiments can detect an anomalous O/S that was fingerprinted inside the network. For example, if all learned end stations inside the network correlate to a Windows O/S and suddenly activity corresponding to a different O/S (e.g., Mac OS X, macOS, iOS, Ubuntu, Linux Mint, Debian, CentOS, etc.) is observed inside the network it may be cause for concern as some process may be impersonating an end station, an attacker/intruder has introduced a new end station into the network, etc.

As yet another example, noisy tokens that point to a web target server can reveal the user agent of the requesting client and other characteristics of the default browser used by the requesting end station. When a software agent operates in a network protocol, it often identifies itself, its application type, operating system, software vendor, and/or software version, by submitting a characteristic identification string to its operating peer. In HTTP, this identification is transmitted in a header field referred to as the "User-Agent." One example of a User-Agent string for the Safari browser executing on an iPad mobile device is "Mozilla/5.0 (iPad; U; CPU OS 3_2_1 like Mac OS X; en-us) AppleWebKit/531.21.10 (KHTML, like Gecko) Mobile/7B405".

Embodiments can use standard fingerprinting techniques to fingerprint the web browser used by the domain account. Once embodiments learn which web browsers are used by which accounts, they can detect when a different browser is being used for a particular domain account.

Figure 4:
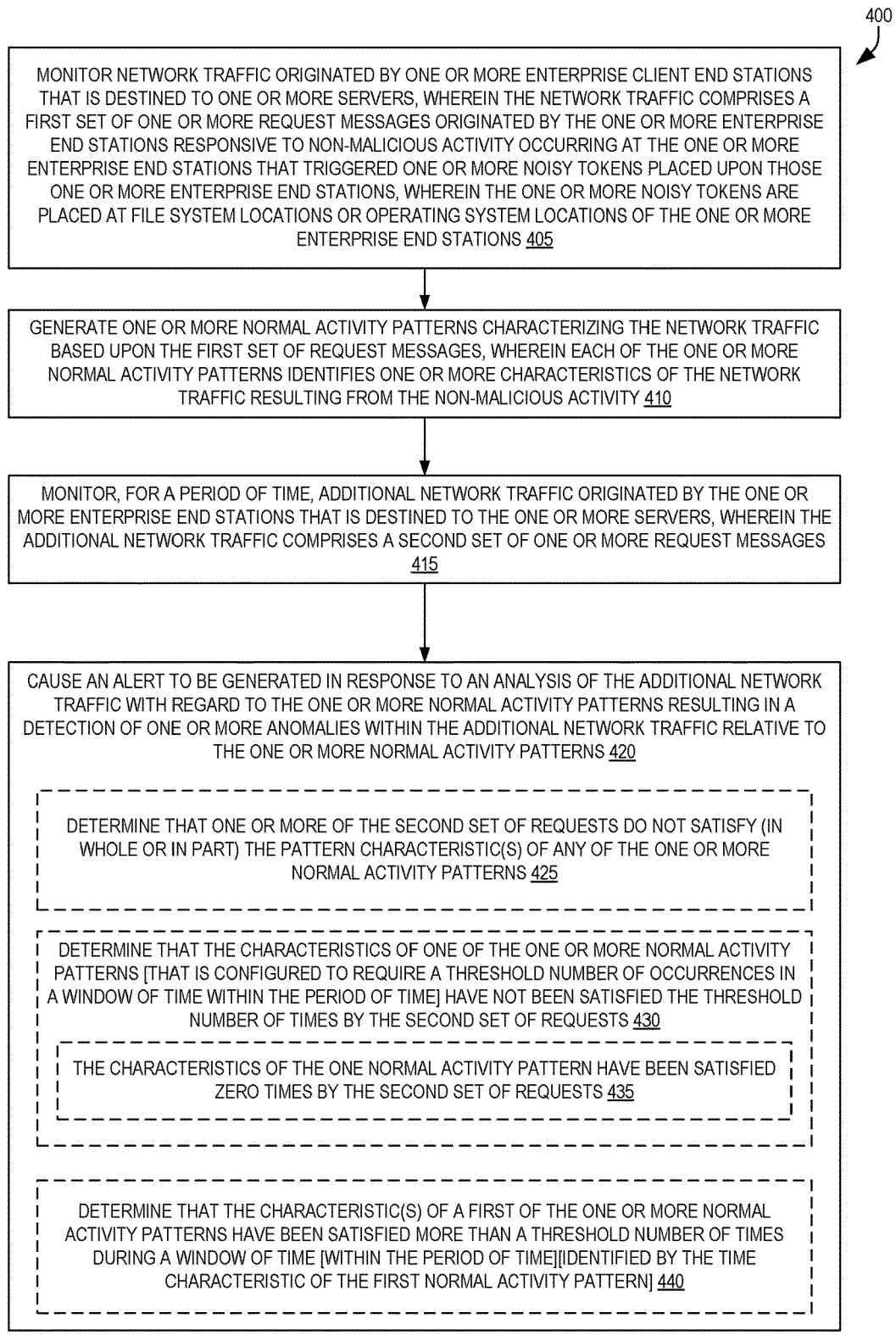
FIG. 4 is a flow diagram illustrating operations for detecting compromises of enterprise end stations utilizing noisy tokens according to some embodiments.

Any or all of these various techniques can be implemented using noisy tokens together with learning and detection operations. FIG. 4 is a flow diagram illustrating operations 400 for detecting compromises of enterprise end stations utilizing noisy tokens according to some embodiments. These operations 400 can be performed by the TMM 104 of FIG. 1 or FIG. 2, for example.

The operations 400 include, at block 405, monitoring network traffic originated by one or more enterprise end stations that is destined to one or more servers. The network traffic comprises a first set of one or more request messages originated by the one or more enterprise end stations responsive to non-malicious activity occurring at the one or more enterprise end stations that triggered one or more noisy tokens placed upon those one or more enterprise end stations. The one or more noisy tokens are placed at file system locations or operating system locations of the one or more enterprise end stations that are triggered by the non-malicious activity.

At block 410, the operations 400 include generating one or more normal activity patterns characterizing the network traffic based upon the first set of request messages. Each of the one or more normal activity patterns identifies one or more characteristics of the network traffic resulting from the non-malicious activity.

At block 415, the operations 400 include monitoring, for a period of time, additional network traffic originated by the one or more enterprise end stations that is destined to the one or more servers. The additional network traffic comprises a second set of one or more request messages.

At block 420, the operations 400 include causing an alert to be generated in response to an analysis of the additional network traffic with regard to the one or more normal activity patterns resulting in one or more anomalies being detected.

The analysis can optionally include, at block 425, determining that one or more of the second set of requests do not satisfy (in whole or in part) the pattern characteristic(s) of any of the one or more normal activity patterns.

The analysis can optionally include, at block 430, determining that the characteristics of one of the one or more normal activity patterns have not been satisfied a threshold number of times by the second set of requests. The one normal activity pattern can be configured to require the threshold number of occurrences within a window of time within the period of time. Block 430 can further include block 435, where the characteristics of the one normal activity pattern have been satisfied zero times by the second set of requests.

The analysis can optionally include, at block 440, determining that the characteristic(s) of a first of the one or more normal activity patterns have been satisfied more than a threshold number of times during a window of time. The window of time can be within the period of time, and can be identified by the time characteristic of the first normal activity pattern.

Figure 5:
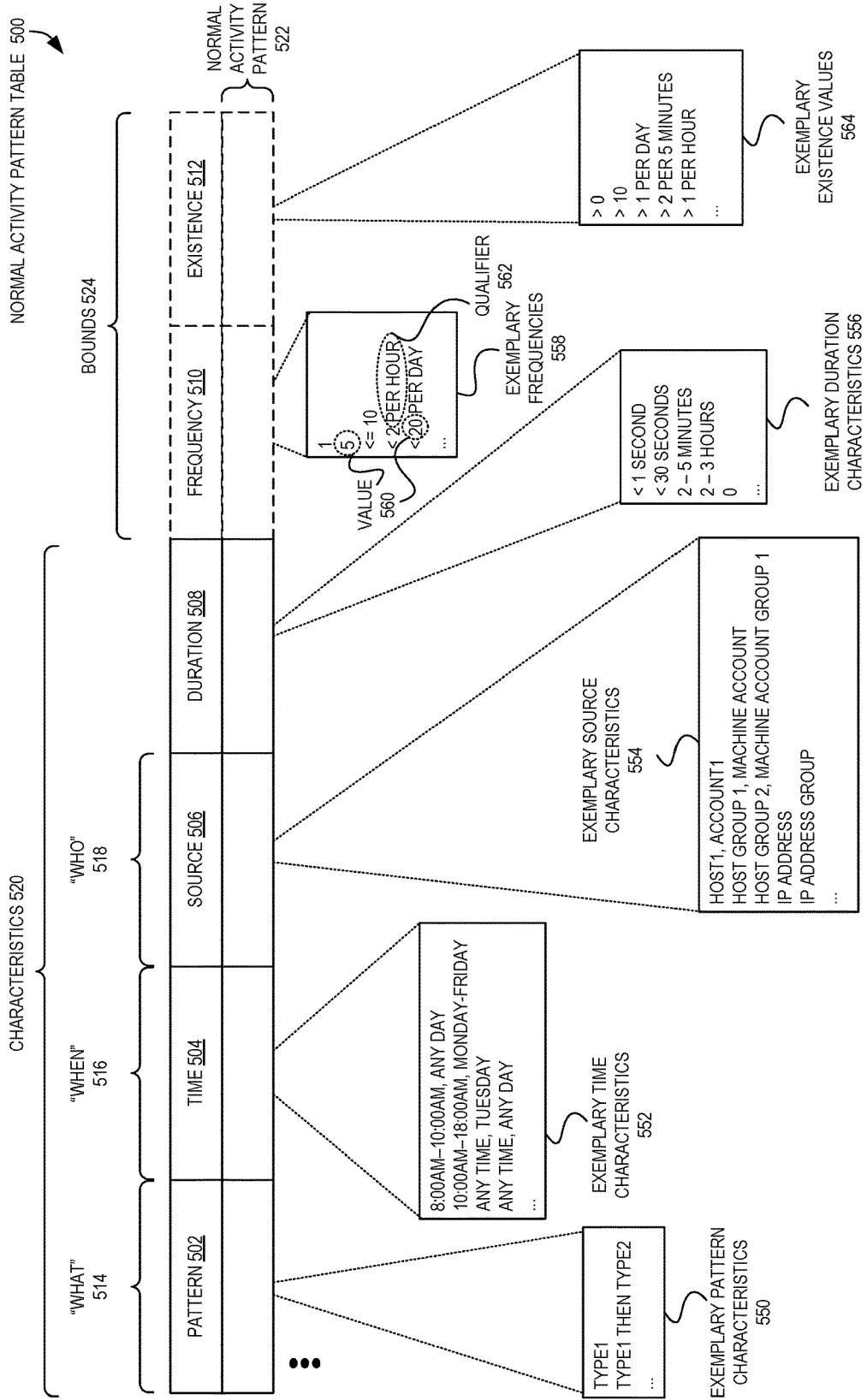
FIG. 5 is a block diagram illustrating an exemplary normal activity pattern table according to some embodiments.

For further detail regarding normal activity patterns that can be generated based upon traffic resulting from noisy tokens being triggered and utilized to detect anomalies, we turn to FIG. 5, which is a block diagram illustrating an exemplary normal activity pattern table 500 according to some embodiments. This illustrated normal activity pattern table 500 includes one or more rows, each corresponding to a normal activity pattern 522 that can be learned by the analysis module 177 of the TMM 104 (e.g., based upon noisy token traffic 132 triggered by non-malicious operations).

As illustrated, the normal activity pattern table 500 is described as a model in the form of a table having rows and columns (representing attributes of each normal activity pattern), though this representation is merely one way to represent the model. Accordingly, in other embodiments the normal activity pattern table 500 can be represented/implemented in a variety of other ways, such as using graph data structures or other data structures and/or formats known by or straightforwardly derivable by those of skill in the art.

The normal activity pattern table 500 is illustrated as including a set of characteristics 520 and optionally a set of bounds 524. The set of characteristics 520 can be used to characterize a particular pattern of noisy token traffic, and include a pattern characteristic 502, a time characteristic 504, a source characteristic 506, and a duration characteristic 508. In other embodiments, more, fewer, or different characteristics 520 can be utilized, and thus it is to be understood that this collection and arrangement of characteristics 520 is exemplary.

One of the characteristics 520 is a pattern characteristic 502, which can also be referred to as a "what" 514 of each normal activity pattern 522 as it describes what network traffic (e.g., what one or more request messages) constitute the pattern 522. The pattern characteristic 502 can thus directly identify particular request messages (or indirectly identify request messages, such by including logic allowing for particular request messages to be identified) that need to be observed by the TMM 104.

In some embodiments, the pattern characteristic 502 can include one or more traffic type identifiers. A traffic type identifier can comprise a specific value (e.g., a particular resource requested by a request message, a particular destination of a request message, a particular destination port used by the request message, etc.) or even more complex logic that can be used to identify a type of message.

Two simple exemplary pattern characteristics 550 are illustrated in FIG. 5, which are represented as "TYPE1" (i.e., a single traffic type identifier thus requiring one particular request message) and "TYPE1 THEN TYPE2" (i.e., two traffic type identifiers with an ordering constraint thus requiring two request messages be observed in a particular order).

Accordingly, in some embodiments, the pattern characteristic 502 can comprise an ordered or unordered list of traffic type identifiers. For example, the pattern characteristic 502 could comprise an ordered list of traffic type identifiers that would require a particular set of request messages to be observed in that order for the pattern to be matched, whereas the pattern characteristic 502 could also comprise an unordered list of traffic type identifiers simply requiring that the particular set of request messages are observed in any order.

In some embodiments, the pattern characteristic 502 could be a logical statement (e.g., a regular expression or similar pattern) that can be evaluated to determine whether the pattern was observed. For example, one pattern characteristic 502 could comprise a regular expression requiring one or more occurrences of a first type of traffic, then zero or more occurrences of a second type of traffic, and then one or more occurrences of a third type of traffic. Thus, the logical statement could define conditions associated with the observation of the particular traffic, such as definite or indefinite numbers of (e.g., quantifiers of) the traffic types that need to be observed, maximum or minimum time delays observed between observations of request messages, etc.

In some embodiments, the pattern characteristic 502 of each normal activity pattern 522 of the table 500 must be unique, but in other embodiments, it may be possible for multiple normal activity patterns 522 to have a same pattern characteristic 502. In the latter case, one or more other characteristics 520 typically differ, though, to represent the same pattern characteristic 502 being observed at a different date/time, from a different actor, over a different amount of time, etc.

Another of the characteristics 520 is a time characteristic 504 that indicates "when" 516 the pattern characteristic 502 is "normally" observed for the normal activity pattern 522.

In some embodiments, the time characteristic 504 comprises a two dimensional vector having an "hour in the day" dimension (e.g., between 8 am and 9 am, at any hour of the day, etc.) and a "day in the week" dimension (e.g., on Monday, on each day Monday through Friday, on Saturday, on any day of the week), but other formats can be utilized in other embodiments. In some embodiments, this formulation is generalized to include "day in a month" or more complex constructs (e.g., to allow for "every second Monday" or "the first Friday of every month").

Thus, several exemplary time characteristics 552 are illustrated, including "8:00 am-10:00 am, any day" and "10:00 am-18:00 am, Monday-Friday" and "Any time, Tuesday" and "Any time, any day."

In some embodiments, these "when" 516 values may reflect a contiguous time frame at each dimension separately. That is, if a pattern appears between 10:00-11:00 on Monday and then again between 13:00-14:00 on Monday, this same pattern characteristic 502 may be utilized in two separate normal activity patterns 522 in the table 500. In the same way, in some embodiments when a pattern appears between 10:00-11:00 on Monday through Thursday, it may have a single row in the table 500, but if it appears 10:00-11:00 on Monday and then 10:00-11:00 on Thursday it may be represented as two separate rows. However, this choice to separate (or combine) a pattern characteristic 502 into one or multiple rows (i.e., normal activity patterns 522) can be thought of as an arbitrary choice that does not significantly change the algorithms—for example, a single row could be to include multiple non-contiguous ranges, or on the other hand, each row could be limited to a single day of the week.

Another of the characteristics 520 is a source characteristic 506 that indicates "who" 518 the pattern characteristic 502 is "normally" observed from.

As an example, in some embodiments, a source characteristic 506 can be a one or two-dimensional vector including one or both of a machine value and an account value. The machine value can include an identifier of a machine, such as a host name, an IP address, group of machines, wildcard, etc., and the account value can be a wildcard, user account, machine account, group identifier (e.g., executives, finance department, administrators), etc. In some embodiments where a source characteristic 506 includes both a machine value and an account value, a determined source of the traffic (identified by the pattern characteristic 502) must match the machine and account values for the normal activity pattern 522 to be matched.

Several exemplary source characteristics 554 are illustrated, and include "HOST1, ACCOUNT1" (i.e., an identifier of an end station and an identifier of an account), "HOST GROUP 1, MACHINE ACCOUNT" (i.e., an identifier of a group of end stations and an identifier of a machine account), "HOST GROUP 2, MACHINE ACCOUNT GROUP 1" (i.e., an identifier of a group of end stations and an identifier of a group of machine accounts), "IP ADDRESS" (i.e., a network address), and "IP ADDRESS GROUP" (i.e., an identifier of a group of network addresses).

In some embodiments, when a normal activity pattern 522 is configured with an existence bound 512 (described in additional detail later herein) and the source characteristic 506 includes a group identifier, the existence bound 512 may be satisfied when each and every member of that group has originated the traffic described by the pattern characteristic 502. Accordingly, in such a case if a group identifier identifies a group of three accounts or machines, each of those three must originate traffic described by the pattern.

Optionally, the normal activity pattern table 500 also includes one or both of a frequency bound 510 and existence bound 512.

In some embodiments, those of the normal activity patterns 522 including a frequency bound 510 value are thus configured such that that pattern characteristic 502 is expected to be observed the frequency bound 510 value number of times during the "when" 516 time frame of the normal activity pattern 522.

In some embodiments, a frequency bound 510 may include just a number (or value 560) that indicates a test over the time frame defined by the "when" 516 column (e.g., "Tuesday", "10:00-12:00") is to be performed. Thus, if a frequency bound 510 is a single number (without a "qualifier" as described below), then this number can represent the maximum number of times that the pattern characteristic 502 is expected to be observed during the entire "when" time frame.

However, in some embodiments a frequency bound 510 may include a number (i.e., value 560) and a qualifier 562 (e.g., indicating a rate). In these embodiments, a frequency bound 510 with a qualifier 562 is tested over time frames the size of the qualifier 562 within the time frame defined by the "when" 516 column (i.e., the time characteristic 504). For example, in the exemplary frequencies 558, one frequency bound 510 including both a value 560 and a qualifier 562 is "<2 PER HOUR," and thus the pattern characteristic 502 is tested over hour sized time frames (due to the qualifier 562 being "per hour") that exist within a time frame defined by the time characteristic 504 (e.g., 8-10 am would include two such "hour" time frames). Thus, in this example, the frequency bound 510 would require that the pattern characteristic 502 is observed fewer than two times between 8-9 am, and also observed fewer than two times between 9-10 am.

In some embodiments, the learning algorithm ensures that no impossible configurations will result, such as a "weekly" frequency in a "Tuesday" time frame, an hour long duration characteristic 508 with a 5 minute frequency, etc. In some embodiments, the longest size qualifier 562 is "weekly" (i.e., "per week"), though in other embodiments it could be longer or shorter.

In some embodiments, for "when" 516 values that specify particular hours in the day, frequencies bounds 510 with qualifiers 562 can be measured at equal size windows starting at the beginning of the specified hour interval. For example, if the specified hours are 13:30-17:00 and the frequency qualifier 562 is "5 mins", then the first interval for the frequency test may be "13:30-13:35", the second at "13:35-13:40", and so on. In some embodiments, for "when" 516 values that specify "any time", frequencies with qualifiers 562 can be measured at equal size windows starting at 12:00 am (i.e., midnight). Additionally, in some embodiments the first time window for a "when" 516 value of "any time, any day" may start at 12:00 am on Monday (i.e., the first day of the week).

In some embodiments, the "weekly" frequency qualifier 562 may only be relevant for "when" 516 values that include "any day", and the "daily" frequency qualifier 562 may only be relevant for "when" 516 values that include "any time".

In some embodiments, each normal activity pattern 522 can include potentially more than one frequency values to be validated for that pattern (e.g., both "<2 PER HOUR" and also "<20 PER DAY"). In some embodiments, a simpler representation can be used requiring that each normal activity pattern 522 has a single frequency value, and thus to enforce that some pattern appears no more than once and hour and no more than 10 times a day, two separate normal activity patterns 522 would be utilized (albeit with a same pattern characteristic 502, etc.).

Optionally, the normal activity pattern table 500 may include an existence bound 512, which here is illustrated as being separate from the frequency bound 510, but some embodiments incorporate the notion of existence and frequency into a single bound that includes both a lower bound (for "existence") and an upper bound (for "frequency").

The interpretation of the existence bound 512 value is somewhat the same as that of the frequency bound 510, and serves as a lower bound on the number of times a pattern must show up within a time frame.

In some embodiments, a same normal activity pattern 522 may have a same frequency bound 510 value and existence bound 512 value. However, other embodiments may require a normal activity pattern 522 to have exactly one of these, or none at all. Yet other embodiments can define one normal activity pattern table 500 for patterns with a frequency requirement, and utilize another separate table for patterns with an existence requirement.

In the example shown in FIG. 5, each normal activity pattern 522 can include zero, one, or even more than one existence values to be validated for the pattern. However, other embodiments could require that each normal activity pattern 522 has at most single existence value.

Several exemplary existence values 564 are shown in FIG. 5 and include ">0", ">10", ">1 PER DAY", ">2 PER 5 MINUTES", and ">1 PER HOUR." Thus, it is to be understood that each existence bound 512 can be a single value (e.g., ">0") or a value with a qualifier (e.g., ">1 PER DAY"), and that a single normal activity pattern 522 can have zero existence bounds 512, one existence bound 512, or multiple existence bounds 512 that all must be valid.

Embodiments utilizing frequency bounds 510 and/or existence bounds 512 can provide the benefits described above, and notably, can allow for more complex scenarios to be monitored/enforced than otherwise could be possible. For example, it could be the case that in a particular environment a particular pattern could be observed very frequently, but never observed more than once per minute. If this would be expressed in a naive manner using individual normal activity patterns 522, it would require such a larger number of normal activity patterns 522 in the table 500, and for every such pattern this would explode the required size of table 500, rendering it impractical. Instead, this behavior can beneficially be encapsulated using a frequency bound 510 within (perhaps) just one normal activity pattern 522.

Figure 6:
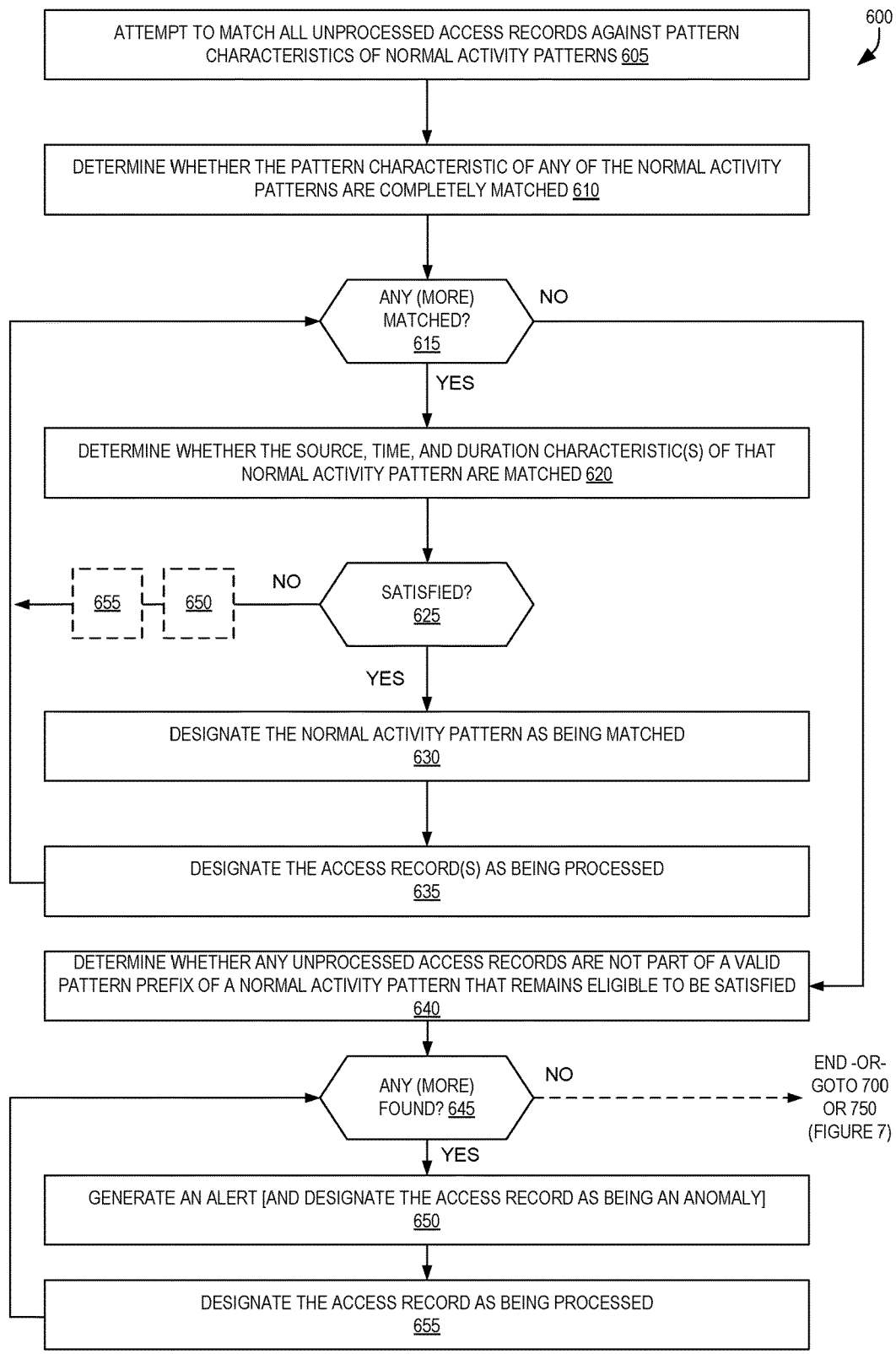
FIG. 6 is a flow diagram illustrating operations for access record processing according to some embodiments.

Turning to FIG. 6, a flow diagram illustrates operations 600 for access record processing according to some embodiments. These operations 600 can be performed by the TMM 104, and can be performed on a periodic basis (e.g., once an hour, once every two hours, once a day, etc.). Thus, the operations 600 may be performed for a "window of time" that begins at the time of the last processing (of operations 600) and ends at the current time, but the window of time could also be a different window of time.

At block 605, the operations 600 include attempting to match all unprocessed access records against pattern characteristics of normal activity patterns. Block 605 can include the use of a set of access records (e.g., each representing a unit of noisy token traffic) that can be obtained as described herein (e.g., via direct monitoring of traffic, indirect monitoring via log files or reports from server(s) 111, etc.).

Block 605 could be performed in an access record centric manner and include, for each access record, determining whether it "matches" any of the pattern characteristic 502 values of any of the normal activity patterns 522 of the normal activity pattern table 500.

Alternatively (or additionally), block 605 could be normal activity pattern 522 centric, and thus include identifying which normal activity patterns are "valid" for the considered window of time (e.g., those that should have been observed during the window of time, as determined based upon the time characteristic 504 and/or duration characteristic 508 of the pattern), examining the pattern characteristic 502 for each such pattern, and determining whether there are unprocessed access records that satisfy the pattern characteristic 502.

Block 610 includes determining whether the pattern characteristic of any of the normal activity patterns are completely matched (by one or more of the unprocessed access records).

For each normal activity pattern having its pattern characteristic 502 being matched (at block 615), the operations 600 continue with block 620 and determining whether the source characteristic 506, time characteristic 504, and duration characteristic 508 of that normal activity pattern are matched. Block 620 can include determining whether a source of the traffic matching the pattern characteristic 502 is the same as the source characteristic 506, determining whether the traffic matching the pattern characteristic 502 satisfies the time characteristic 504 (e.g., lies within a window of time identified by the time characteristic 504), and/or determining whether the traffic matching the pattern characteristic 502 satisfies the duration characteristic 508 (e.g., occurred within the allowable amount of time proscribed by the duration characteristic 508).

When these characteristics are determined to be satisfied (at block 625), the operations 600 continue to designate (at block 630) that normal activity pattern 522 as being matched (for this processing period) and (at block 635) designating the one or more access records that satisfied the pattern characteristic 502 as being processed. These operations at block 630 and 635 can be performed in a variety of ways known to those of skill in the art, including but not limited to changing a bit or value within an array or database for the pattern and/or access records (e.g., within a volatile or non-volatile memory), etc. At that point, the operations 600 can continue back at block 615, where any additional normal activity patterns 522 having satisfied pattern characteristics 502 are similarly processed.

However, when these characteristics are determined to not be satisfied (at block 625), the operations may continue with examining a next matched pattern (at block 615), should one exist, and thus that normal activity pattern may remain designated as un-matched and the access records—despite satisfying the pattern characteristic 502 of that pattern—may similarly remain "unprocessed." Alternatively, in some embodiments, upon determining that the source, time, and duration characteristics of the normal activity pattern are not satisfied by the one or more involved access records matching the pattern characteristic of the normal activity pattern (at block 625), blocks 650 and 655 may be performed—i.e., at block 650 an alert can be generated (and optionally the involved access records can be designated as anomalous) and at block 655 the involved access records can be designated as being processed. Accordingly, in some embodiments, the alert generated at block 650 can be associated with one or even multiple access records, the latter of which can reduce the total number of alerts generated and thus provide useful context to and prevent overwhelming a system administrator who may receive the alerts.

When no normal activity patterns 522 remain that have a matched pattern characteristic 502, the operations 600 may continue at block 640 with determining whether any unprocessed access records exist that are not part of a valid pattern prefix of a normal activity pattern that remains eligible to be satisfied.

An unprocessed access record is part of a valid pattern prefix when it serves as a part of a pattern characteristic 502 of a normal activity pattern 522, where the normal activity pattern 522 is not yet completely matched/satisfied, and where the normal activity pattern 522 can potentially still be satisfied (e.g., by additional traffic occurring at a later time than the time frame under consideration) using that unprocessed access record. Thus, one or more access records (corresponding to one or more messages sent responsive to noisy tokens being triggered) are part of a valid pattern prefix when they match a true prefix of a pattern where the time frame between the current time and the first access in the set is less than the allowable duration (per the duration characteristic 508) of the pattern—i.e., there remains time for the pattern to be satisfied.

For example, assume the processing operations 600 are performed at 10:02 am and that a normal activity pattern has a "when" 516 (a time characteristic 504) of 8:00 am-2:00 pm and a duration characteristic 508 of 2 hours. In this case, it is possible that only a prefix of the pattern will be observed as of 10:02 am (e.g., an access record is observed at 9:00 am), because the end of the "when" 516 has not yet been reached and the duration characteristic 508 allows until 11:00 am for the pattern to be fully satisfied with that access record. However, if the duration characteristic 508 instead was only 1 minute, and the access record was observed at 9:00 am, then this observed traffic would not be a valid prefix, because that pattern would have to be fully satisfied between 9:00 am-9:01 am. Thus, this determination can be based upon the start time of the prefix (here, 9:00 am) combined with the duration (here, 1 minute) relative to the time of the window of data being processed.

When any unprocessed records are found that are not part of a valid prefix, at block 645 each of these unprocessed records will cause (at block 650) an alert to be generated (e.g., alert data 148, etc., as described herein) and/or the access record to be designated as being an anomaly. Additionally, at block 655, the access record is designated as being processed, and the operations continue back at block 645.

Figure 7:
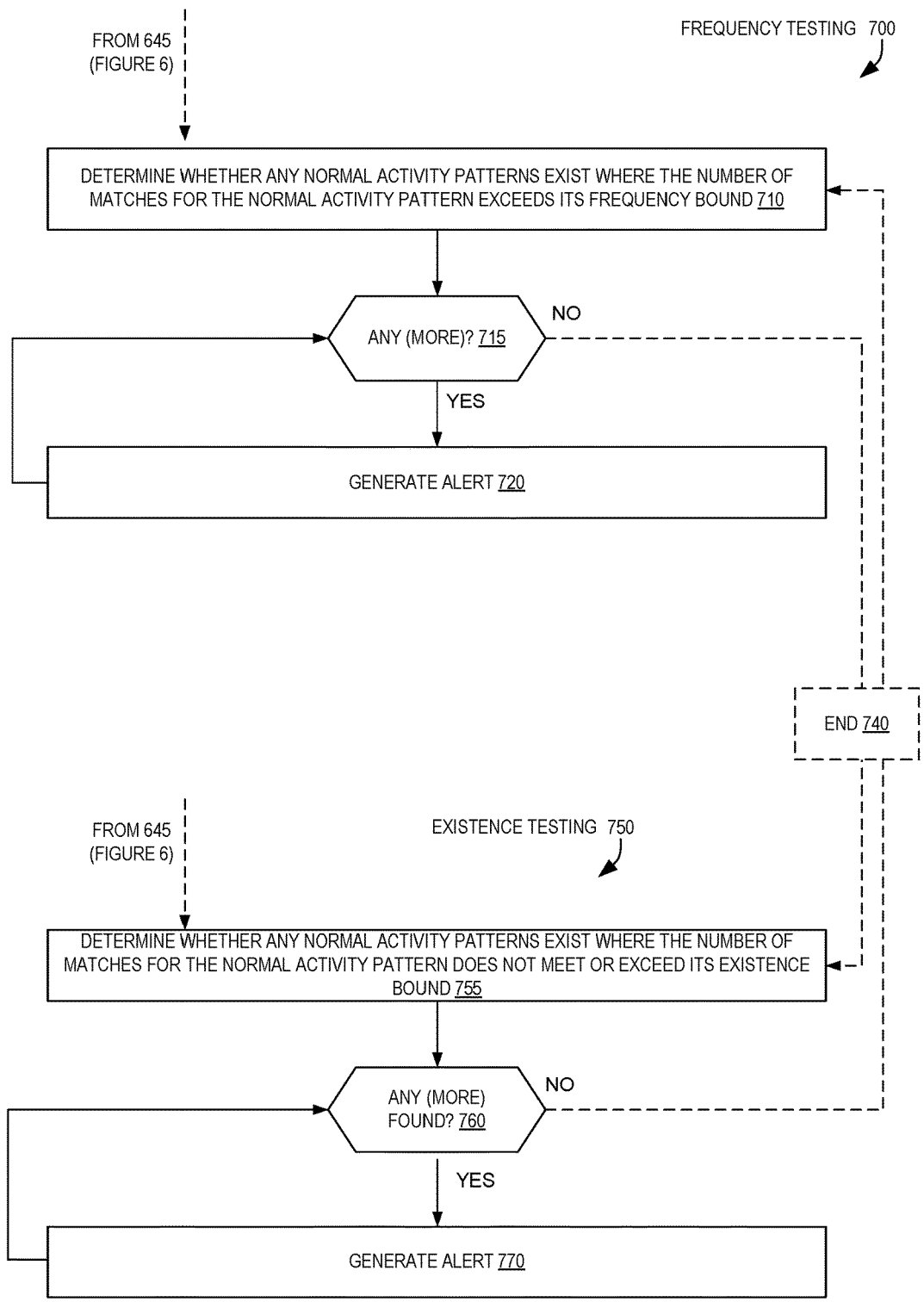
FIG. 7 is a flow diagram illustrating operations for frequency testing and operations for existence testing according to some embodiments.

In some embodiments, the processing operations 600 may end at this point. However, in some embodiments, the operations 600 may cause additional frequency testing operations 700 and/or existence testing operations 750 to be performed, as illustrated in FIG. 7, which is a flow diagram illustrating frequency testing operations 700 and existence testing operations 750 according to some embodiments.

Thus, in some embodiments either or both of operations 700/750 may be performed after the processing operations 600 of FIG. 6. However, some embodiments do not perform either or both of operations 700/750, and some embodiments may perform either or both of operations 700/750 at a different time, which may be unrelated to the performance of the processing operations 600 of FIG. 6. For example, either or both of operations 700/750 may be performed at regular intervals, when a threshold number of noisy tokens have been triggered (e.g., as identified by the access records), a combination of both, etc.

The frequency testing operations 700 include, at block 710, determining whether any normal activity patterns exist where the number of matches for the normal activity pattern exceeds its frequency bound (when it has one).

As indicated above, in some embodiments there can be multiple frequency tests defined for a single normal activity pattern 522. In such cases, the operations of block 710 can include determining whether any of the multiple frequency bound 510 tests have been violated, which can include determining how many times the characteristics 520 of the normal activity pattern 522 have been satisfied, and determining whether this number exceeds any of the frequency tests of the frequency bound 510 of that normal activity pattern 522.

For each such normal activity pattern 522, at block 715, an alert is generated at block 720. When alerts have been generated for any and all such normal activity patterns 522, the operations may end (at block 740). Alternatively, the existence testing operations 750 could be triggered.

Thus, the frequency testing operations 700 could be performed at the end of processing operations 600, performed at the end of the existence testing operations 750, or performed at another time (i.e., independently of the operations 600 and/or 700).

At block 755, the existence testing operations 750 include determining whether any normal activity patterns exist where the number of matches for the normal activity pattern does not meet or exceed its existence bound. Similar to the frequency bound, an existence bound 512 can include zero, one, or multiple existence tests. When multiple existence tests are used for a single normal activity pattern 522, block 755 can include determining whether all of the existence tests are satisfied, though in some embodiments block 755 could alternatively include determining whether at least one of the multiple existence tests are satisfied.

For those patterns having an ending "when" value (combined with the duration characteristic 508) that ends within the window of time being processed, and have an existence test (of the existence bound 512) with a value but not a qualifier, a determination is made as to whether the number of normal activity pattern 522 matches (i.e., of the characteristics 520 of the pattern) meets or exceeds that value.

For example, consider a scenario in which the window of time being processed is "Monday from 10:00 am to 4 pm", and a normal activity pattern 522 has a time characteristic 504 (a "when") of "11 am-2 pm, Monday" and a duration characteristic 508 of "1 hour" and an existence bound 512 of "2." In this case, this pattern has an "ending" when value of 2 pm, which is added to the duration of "1 hour" to result in 3 pm. Because 3 pm lies within the window of time being processed, the existence bound 512 (here "2") is to be evaluated by determining whether the total number of matches of the characteristics 520 of the normal activity pattern 522 is met or exceeded. In contrast, if the time characteristic 504 was instead "11 am-4 pm, Monday" (with the other values remaining the same), the existence bound 512 would not be evaluated because the "ending" when value ("4 pm") added to the duration characteristic 508 of "1 hour" would result in "5 pm," which is later than the window of time being processed.

Additionally, for those patterns having an ending "when" value (combined with the duration characteristic 508) that ends within the window of time being processed, and have an existence test (of the existence bound 512) with a value and also a qualifier, a determination is made as to whether the number of normal activity pattern 522 matches (i.e., of the characteristics 520 of the pattern) meets or exceeds that value within each of the time slices indicated by the qualifier.

For example, consider a scenario in which the window of time being processed is "Friday from 10:00 am to 4 pm", and a normal activity pattern 522 has a time characteristic 504 (a "when") of "11 am-2 pm, Friday" and an existence bound 512 of ">2 PER HOUR." In this case, the block 755 operations can include dividing the time characteristic 504 (of "11 am-2 pm, Friday") into time slices of a size indicated by the existence bound 512 qualifier—i.e., "hour." Thus, a first time slice is "11 am-12", and a second time slice is "12-1 pm", and a third time slice is "1-2 pm." The block 755 operations can thus include, for each of these three time slices, determining whether the pattern was matched the "value" (of the existence bound 512) number of times—i.e., 2 times.

For each such normal activity pattern 522 where the number of matches does not meet or exceed its existence bound, at block 760, an alert is generated at block 770. When alerts have been generated for any and all such normal activity patterns 522, the operations may end (at block 740). Alternatively, the frequency testing operations 700 could be triggered.

Thus, the existence testing operations 750 could be performed at the end of the frequency testing operations 700, performed at the end of processing operations 600, or performed at another time (i.e., independently of the operations 600 and/or 700).

Figure 8:
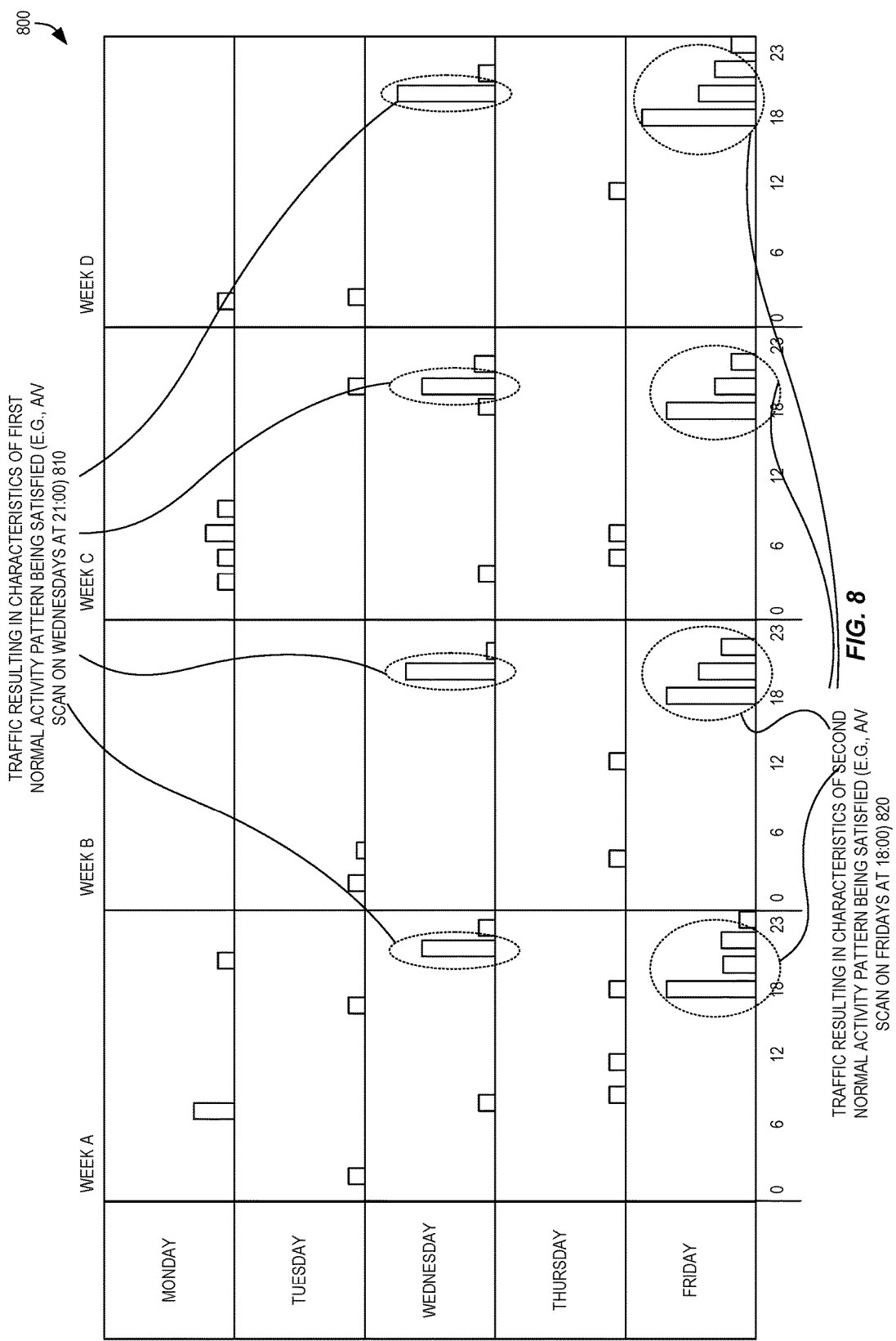
FIG. 8 is graph providing a visual depiction of detected patterns within noisy token traffic according to some embodiments.

FIG. 8 is graph providing a visual depiction 800 of detected patterns within noisy token traffic according to some embodiments.

As described above, a variety of types of analysis can be used during learning to detect particular patterns.

One example includes combining timing analysis, operation type analysis, and meta noise analysis with regard to AV scans. AV scans may read all (or many of) the files on an end station, including symbolic links. By deploying several symbolic links on an end station, and pointing them to a target file server, embodiments can thereby cause an AV scan to generate traffic for each of the symbolic links planted. Optionally, this traffic can even be authenticated to the target server, using the local or domain account performing the scan. Because the AV process is configured to be run as SYSTEM on Windows O/S, each file operation is expected to be performed from a computer domain account. Furthermore, the remote operation on the target server is expected to be a "read" operation. By observing multiple deployed symbolic links over a limited period of time (a few hours for example) embodiments are able to determine which end stations have AV scans enabled on them, those that triggered all of the symbolic links over a short period of time, the computer account utilized, which end stations performed only Read operations, when these scans take place, what is the duration of a scan for that end station, etc.

Thus, in a network that has scheduled AV scans, embodiments can detect an observable peak during times when this scan is scheduled and encode a normal activity pattern 522 describing this observed traffic. Thereafter, if this traffic changes for some reason—such as an attacker disabling AV software, taking an end station offline, etc., the lack of traffic from that end station can be detected. For example, in FIG. 8 the amount of noisy tokens triggered for each day of the week is plotted over a period of four weeks (weeks A-D). In this figure, embodiments can determine two normal activity patterns representative of different AV scans being performed—a first scan scheduled on Wednesdays at 21:00 (see traffic 810) and a second scan scheduled at Fridays at 18:00 (see 820)—due to the significant, pronounced noisy token activity being observed regularly (e.g., a threshold amount of network traffic from noisy tokens is seen within a particular range of time over a particular pattern of days, for example).

Figure 9:
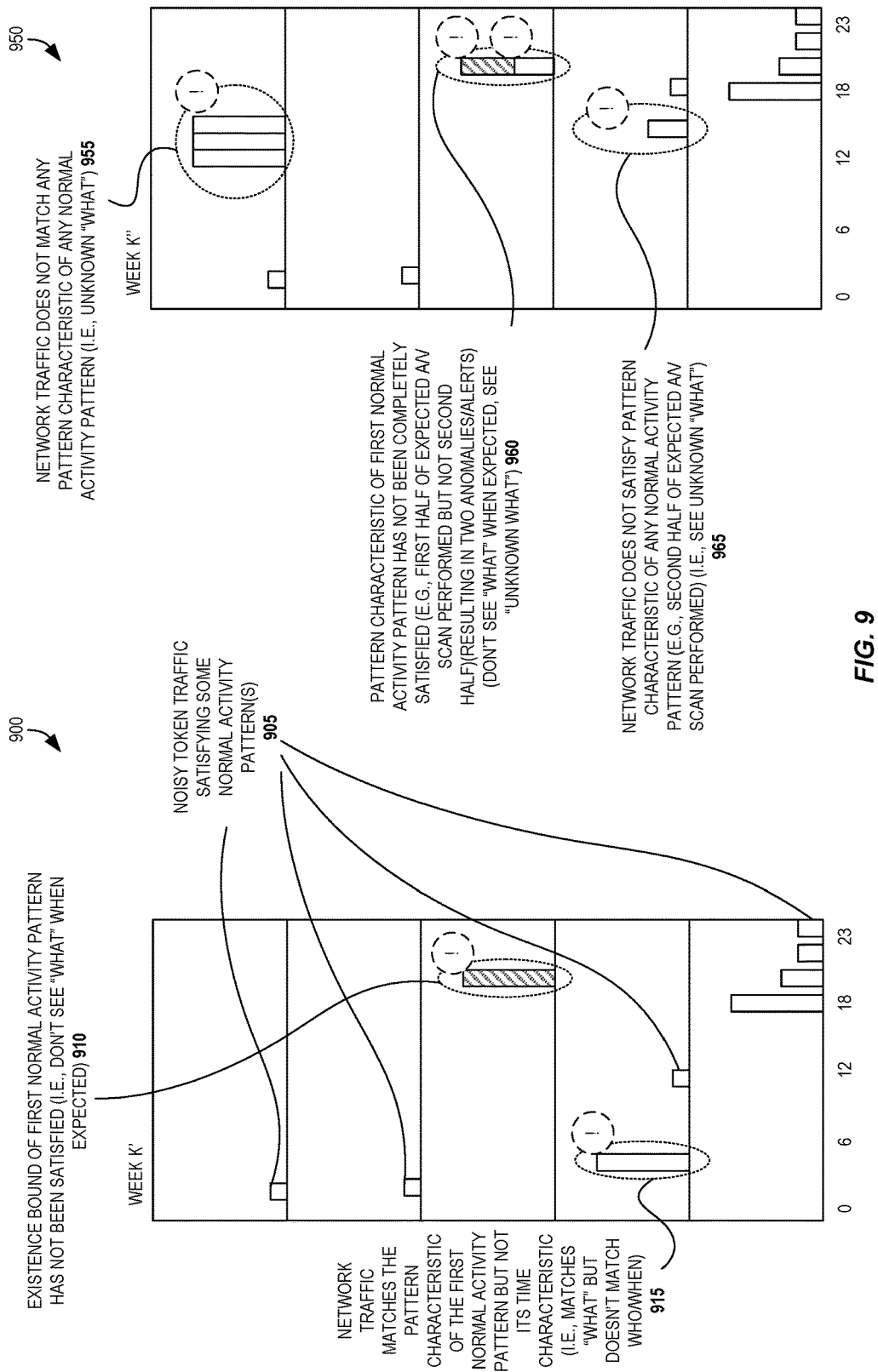
FIG. 9 includes exemplary depictions of scenarios where network traffic adheres to normal activity patterns and where network traffic does not adhere to normal activity patterns according to some embodiments.

With these patterns in mind, FIG. 9 includes exemplary depictions of scenarios 900/950 where network traffic adheres to normal activity patterns and where network traffic does not adhere to normal activity patterns according to some embodiments.

For example, scenario 900 (for a "week k") illustrates some noisy token network traffic 905 satisfying one or more normal activity patterns, this scenario 900 also includes (at 910) a complete lack of the traffic 810 expected for the first normal activity pattern illustrated in FIG. 8—i.e., an existence characteristic of the first normal activity pattern has not been satisfied, in particular due to the pattern characteristic of the pattern not being satisfied. Thus, an alert may be generated.

This lack of traffic may occur due to any number of reasons, such as an attacker disabling an AV scan, or perhaps taking the machine offline or disabling its network interface. However, early the next day (Thursday) this traffic does arrive (at 915); however, although this network traffic matches the pattern characteristic of the first normal activity pattern, it may not satisfy the pattern's time characteristic, which indicates that the pattern characteristic is supposed to be observed on Wednesday between 8:00 pm-11:00 pm. Thus, although the "what" 514 of the pattern is known, this traffic does not satisfy the "when" 516, and thus an alert may be generated to indicate the atypical occurrence.

The second scenario 950 includes a set of network traffic resulting from noisy token accesses on Monday (at 955) that does not match the pattern characteristic of any pattern—thus, an alert may be generated.

Additionally, at 960 approximately only half of the expected traffic (as reflected by the pattern characteristic of the first normal activity pattern) arrives on Wednesday at the appropriate time. Thus, this received portion of the traffic does not fully satisfy the pattern characteristic of the pattern and may ultimately lead to an alert being generated (as the portion of traffic can be an unknown "what"). Additionally, due to lack of the complete pattern characteristic being matched, an alert may be generated due to the existence bound not being satisfied (assuming that such an existence bound is set to require an instance).

Additionally, it may be the case that the second portion of the traffic (that was originally expected to be received on Wednesday as part of the first normal activity pattern) will finally arrive mid-day on Thursday at 965. This second portion will not satisfy the pattern characteristic of any of the patterns (i.e., an unknown "what" is received), resulting in an alert being generated.

Figure 10:
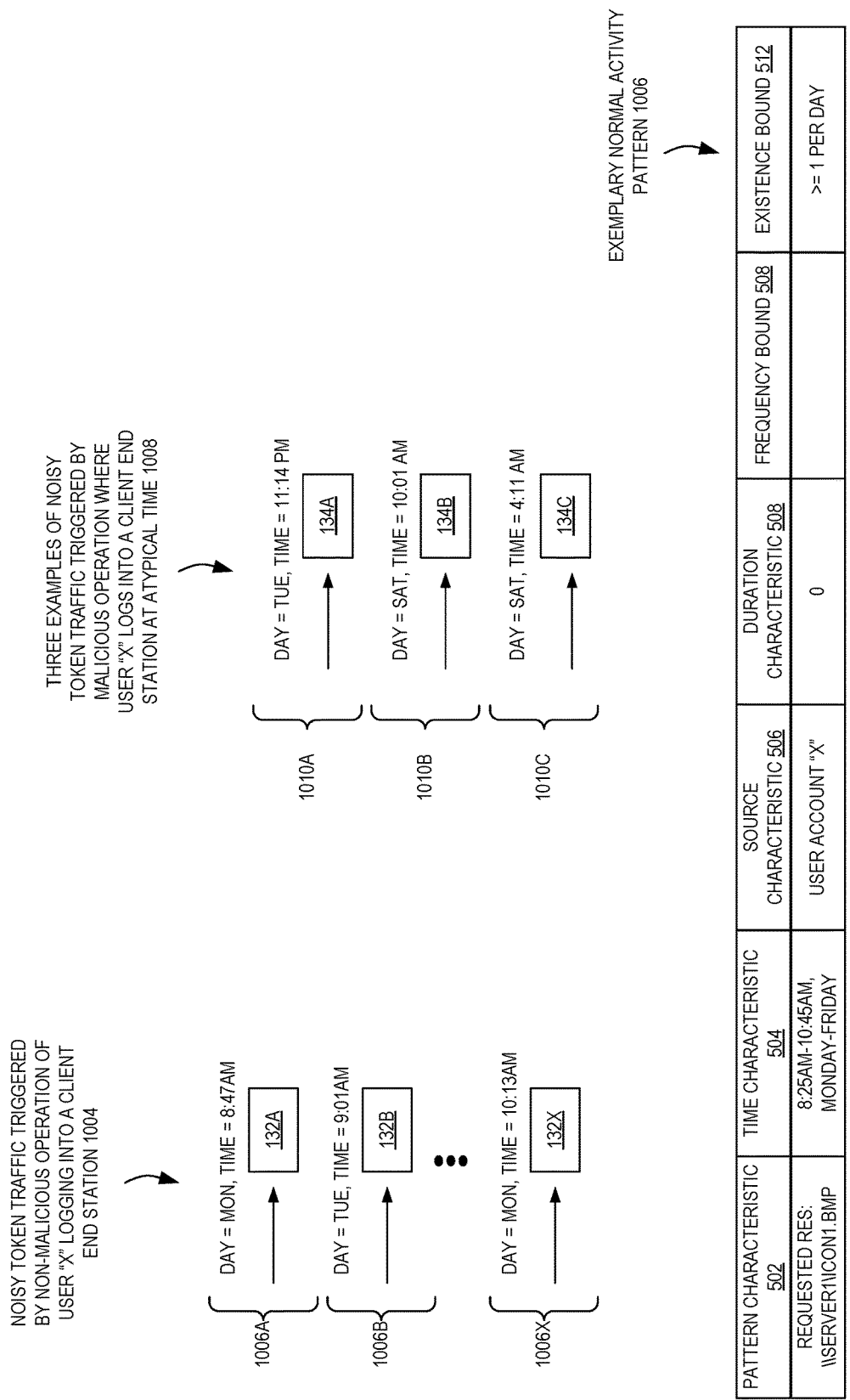
FIG. 10 is a diagram illustrating a normal activity pattern, noisy token traffic triggered by non-malicious activity satisfying the conditions of the normal activity pattern, and noisy token traffic triggered by malicious activity that does not satisfy the conditions of the normal activity pattern according to some embodiments.

For the sake of understanding, FIG. 10 is a diagram illustrating an exemplary normal activity pattern 1006, noisy token traffic 1004 triggered by non-malicious activity satisfying the conditions of the normal activity pattern, and noisy token traffic 1008 triggered by malicious activity that does not satisfy the conditions of the normal activity pattern according to some embodiments.

As described herein, by monitoring network traffic over time resulting from noisy tokens being triggered due to non-malicious activity of one or more enterprise end stations, and determining normal activity patterns 522 that characterize this traffic (when a particular threshold amount of regularity is observed), discrepancies from these normal activity patterns 522 can be detected.

For example, an exemplary normal activity pattern 1006 is illustrated in FIG. 10. This exemplary normal activity pattern 1006 includes a pattern characteristic 502 identifying one type of request message—here, a request for a particular resource "\\Server1\ICON1.BMP". The exemplary normal activity pattern 1006 also includes a time characteristic 504 of "8:25 am-10:45 am, Monday-Friday", a source characteristic 506 of "user account 'X'", and a duration characteristic 508 of "0" (e.g., which can be used to indicate that no duration is applicable, such as when the pattern characteristic identifies a single message). Additionally, the exemplary normal activity pattern 1006 does not include a frequency bound 510 but includes an existence bound 512 of ">=1 PER DAY". Thus, this exemplary normal activity pattern 1006 requires that a request for "\\Server1\ICON1.BMP" must be observed between 8:25 am-10:45 am every day from Monday to Friday at least once, otherwise an alert is to be generated.

Thus, some examples of noisy token traffic 1004 that satisfy the normal activity pattern 1006 (at least for one day) is depicted. We assume that the pattern characteristic 502 is satisfied by each of traffic 132A-132X. At 1006A, traffic 132A is observed on a Monday at 8:47 am; at 1006B, traffic 132B is observed on a Tuesday at 9:01 am; at 1006X, traffic 132X is observed on a Monday (which could be the same Monday as traffic 132A or a different Monday) at 10:13 am. Thus, for these days, an alert will not be generated.

In contrast, some examples of noisy token traffic 1008 that do not satisfy the normal activity pattern (at least for the respective day) is also depicted. We assume that the pattern characteristic 502 is satisfied by each of traffic 134A-134X. However, at 1010A, traffic 134A is observed on a Tuesday at 11:14 pm (which lies outside the hour of day requirement of the time characteristic 504); at 1010B, traffic 134B is observed on a Saturday at 10:01 am (which lies within the hour of day requirement, but outside of the day of week requirement, of time characteristic 504); and at 1010C, traffic 134C is observed on a Saturday at 4:11 am (which lies outside both the hour of day requirement and the day of week requirement of the time characteristic 504).

Figure 11:
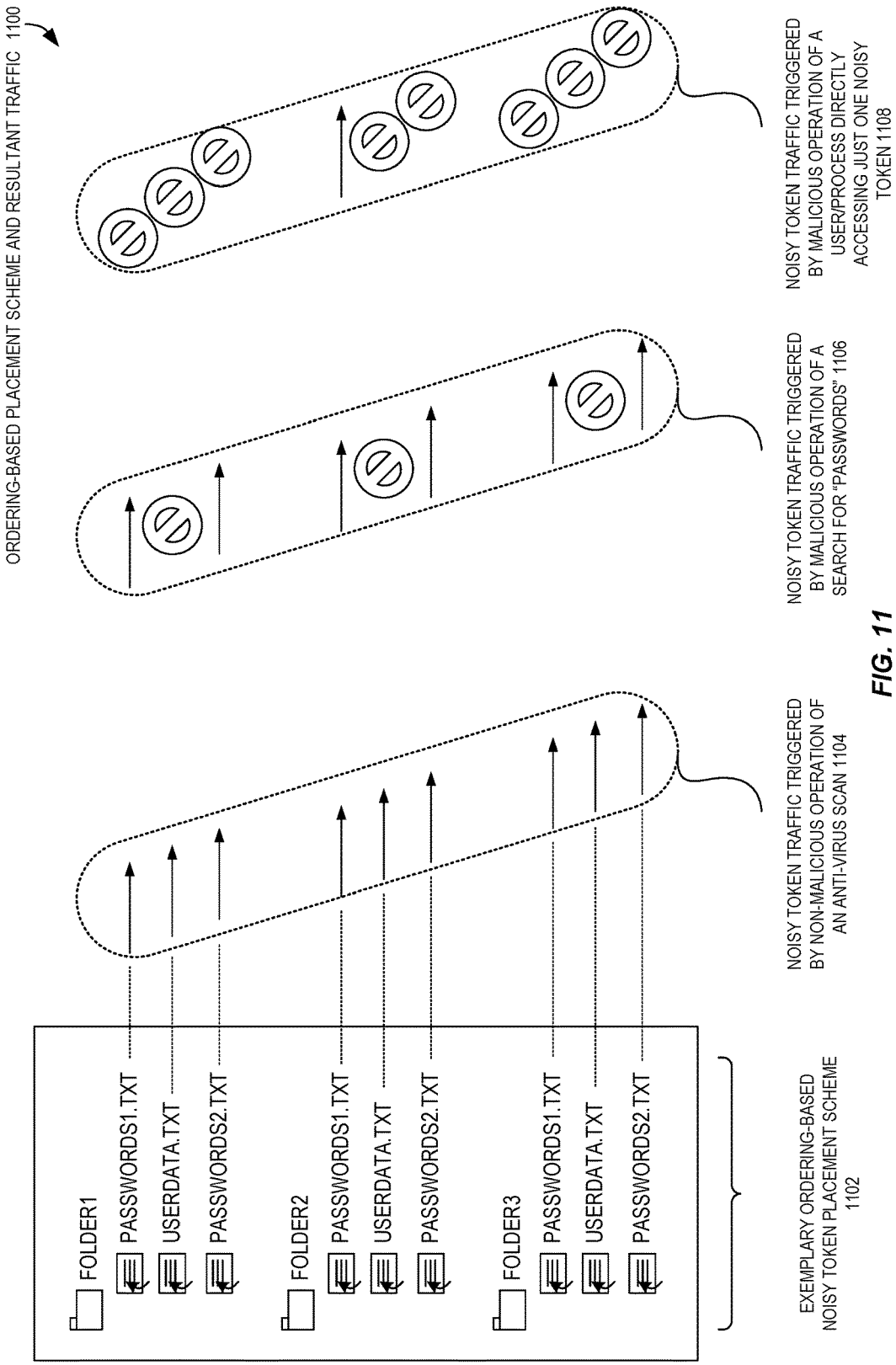
FIG. 11 is a diagram illustrating an exemplary noisy token placement scheme corresponding to an ordering-based normal activity pattern along with different types of noisy token traffic resulting from non-malicious and malicious operations involving the placed noisy tokens according to some embodiments.

Another set of examples is presented in FIG. 11, which is a diagram 1100 illustrating an exemplary noisy token placement scheme corresponding to an ordering-based normal activity pattern along with different types of noisy token traffic resulting from non-malicious and malicious operations involving the placed noisy tokens according to some embodiments.

As described herein, noisy tokens can be placed in a variety of operating system and/or file system locations so that they will be triggered (and thus, result in network traffic being sent) due to a variety of different actions or events. Accordingly, noisy tokens can be placed in particular ways that can assist in detecting particular types of attacks.

For example, an ordering-based placement scheme 1102 can be utilized to enable the issuance of alerts for various types of malicious activity. The illustrated ordering-based placement scheme 1102 includes placing a variety of noisy tokens (e.g., symbolic links with filenames including keywords known to be searched for by attackers) in several consecutive (by name) directories. As illustrated, a "PASSWORDS1.TXT" and "USERDATA.TXT" and "PASSWORDS2.TXT" noisy token is placed in each of three consecutive directories.

This scheme 1102 can allow for the detection of direct accesses (as opposed to accesses by non-malicious "scanners" such as an AV process) by determining the usual order in which these tokens are scanned on an end station, and then distinguishing whether a single token was accessed directly or whether a never seen before process is accessing these files.

For example, in this scenario, an AV scanner might access these files by their respective folder and names, i.e., one after another, which results in an ordered set of network traffic request messages as illustrated at 1104. Thus, a normal activity pattern 522 could be generated with a pattern characteristic 502 requiring these nine request messages to be observed, in order, within a small amount of time (as the duration characteristic 508).

However, if someone is using another mechanism to access these files, for example searching for files with "password" in their filename on an end station, it is likely that they will find only the files with "password" in their filenames Thus, the network traffic observed will include only traffic generated for the "passwords" files, but not the network traffic triggered by the "userdata" files, as illustrated at 1106.

Additionally, if someone is manually exploring (or "browsing") the file system of an end station to look for seemingly valuable information (e.g., credentials, keys, etc.), the user may stumble upon one of the files (here, "PASSWORDS1.TXT" within FOLDER2). Thus, the network traffic observed will include only one request message generated for that single "PASSWORDS1.TXT" access, but not the other network traffic that would be triggered by the other files, as illustrated at 1108.

Figure 12:
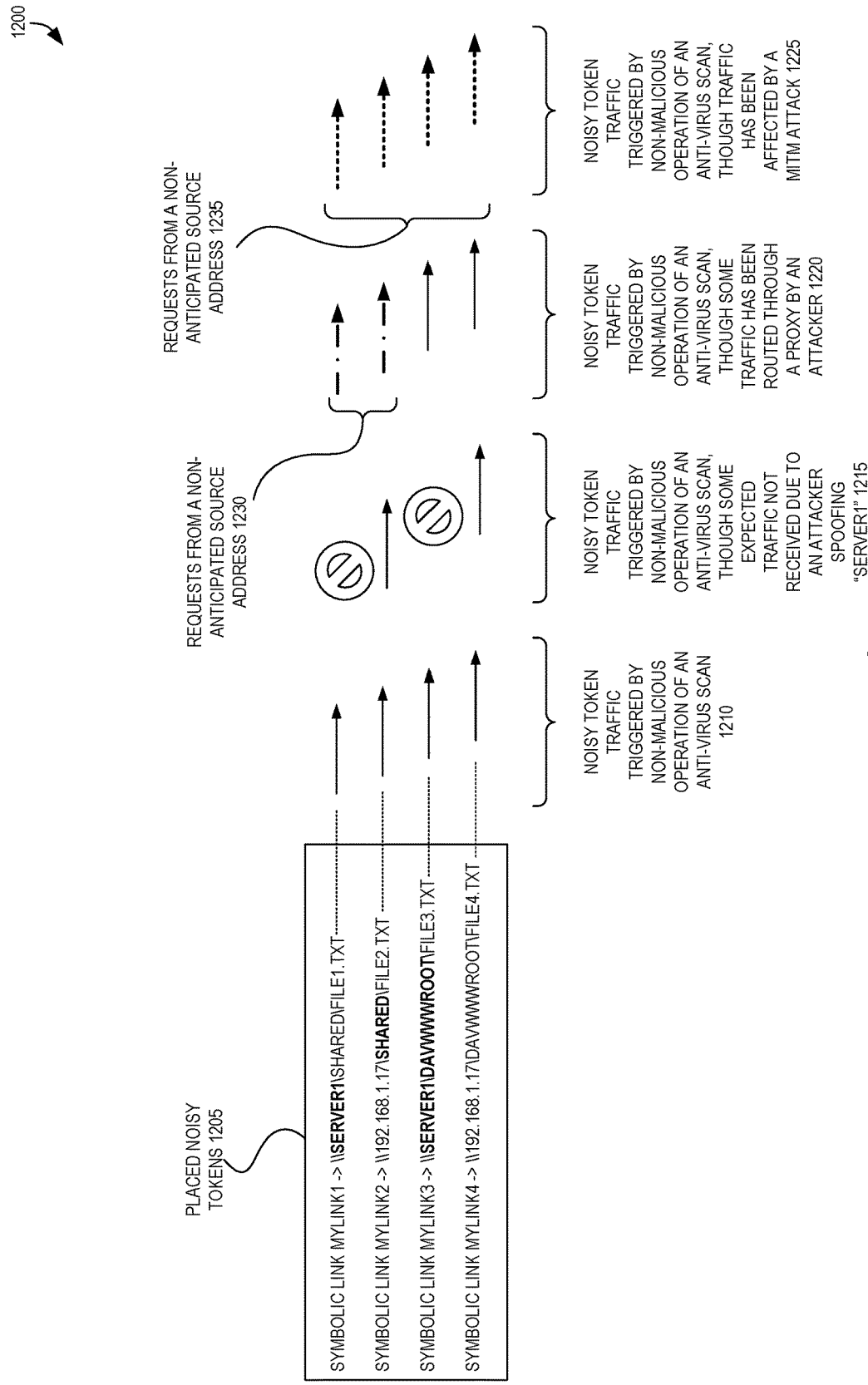
FIG. 12 is a diagram illustrating an exemplary origin-based placement scheme of noisy tokens with different types of noisy token traffic resulting from non-malicious and malicious operations involving the noisy tokens according to some embodiments.

Another example of an intelligent noisy token placement scheme allowing for the detection of a variety of types of malicious activity is illustrated in FIG. 12, which illustrates an exemplary origin-based placement scheme 1200 of noisy tokens with different types of noisy token traffic resulting from non-malicious and malicious operations involving the noisy tokens according to some embodiments.

In this example, a set of noisy tokens 1205 including four symbolic links can be placed at a location (e.g., within a particular directory) within an end station. As illustrated, each of these noisy tokens 1205 is configured with a slightly different target resource identifier. The first and third noisy tokens (MYLINK1 and MYLINK3) utilize the hostname "Server1" to identify the target destination server, while the second and fourth noisy tokens (MYLINK2 and MYLINK4) utilize an internal IP address ("192.168.1.17") to identify the target destination server. Depending upon the particular configuration of the embodiment, the hostname and IP address may or may not correspond to a single server.

Additionally, the first and second noisy tokens (MYLINK1 and MYLINK2) include a directory of "SHARED" whereas the third and fourth noisy tokens (MYLINK3 and MYLINK4) include a directory of "DAVWWWROOT", which is a special keyword used to refer to WebDAV traffic.

Under this placement scheme 1200, a non-malicious scan of an end station may result in these four tokens 1205 being accessed sequentially, and thus the resulting network traffic caused by this sequential access could include four network messages 1210 sent in order. Thus, a normal activity pattern 522 can be determined to require a pattern characteristic 502 including these four messages (perhaps in order) with a duration characteristic 508 of a small amount of time.

Through use of such a normal activity pattern 522, a variety of types of malicious operations can be detected.

As a first example, embodiments can detect an attacker performing spoofing within the enterprise network. Spoofing attacks (and MITM) attacks, which are often performed together as part of a larger attack) are when a malicious actor inside a network is misusing routing protocols to receive connections that are not intended to him/her. For example, an end station attempting to connect to a hostname "server1" may broadcast a request over the network asking who "server1" is. A malicious actor may try to respond to this request with his own network address, making the end station connect to the malicious actors' end station instead of the requested "server1". The attacker may then choose to perform a MITM attack (i.e., propagate the connection to the original "server1") or try to steal credentials from the original connection using basic authentication or other social engineering schemes.

However, when an attacker performs spoofing, some of the traffic resulting from the noisy tokens may be redirected to the attacker's end station. Thus, by continuously monitoring noisy tokens activity (e.g., originating from the same "network group" (such as subnets, LANs, switch) or originating from a single domain account), embodiments can determine when this activity is reduced (for the entire subnet, for a particular domain account, etc.) for specific tokens or for all the tokens all together.

In this example shown at 1215, if the placed noisy tokens 1205 MYLINK2 and MYLINK4 are observed from an end station but the others (MYLINK1 and MYLINK3) are not observed over a short period of time, it may be that an attacker is spoofing "server1" responses, because only tokens that pointed to IPs were observed but not those tokens that used the hostname. Accordingly, embodiments may generate one or two alerts—one for observing an unknown "what" (as the MYLINK2 and MYLINK4 traffic does not match any pattern characteristic) and perhaps one due to the non-occurrence of the "full" four-message pattern (if it is configured with an existence bound 512).

Similarly, another example would be a sudden decrease in the activity of all tokens from end stations found on a particular LAN, which may suggest that an attacker is not only spoofing hostnames but also managed to spoof his IP address (e.g., via ARP poisoning).

Additionally, some embodiments can detect an attacker using proxying techniques. Some attack vectors may configure a compromised end station to be used as proxy by other end stations. One example would be Web Proxy Auto-Discovery Protocol (WPAD) spoofing, when a compromised end station responds to another end station's WPAD proxy queries with its own IP address as the proxy to be used. Thus, in the illustrated example at 1220, if traffic for MYLINK1 & MYLINK2 have a different originating IP than the traffic for MYLINK3 & MYLINK4 (because MYLINK3 & MYLINK4 are CIFS protocol traffic that is not being proxied, as opposed to MYLINK1 & MYLINK2 which are HTTP traffic that is being proxied), it can be detected that something atypical is occurring in the network—here, that traffic (i.e., requests 1230 from a non-anticipated source address) is being proxied through the end station using the IP address reflected by the source IP address of the MYLINK1 & MYLINK2 traffic.

In this case, different embodiments may generate one, two, or even three alerts—one for not seeing the typical pattern of four request messages, and one or two alerts for seeing one or two unknown "whats" (e.g., due to the messages coming from two different sources).

Moreover, some embodiments can detect MITM attacks. When a MITM attack is performed, a sudden change of origin IP (of several enterprise end stations) to a new one (i.e., the attacker's IP address) may be observed because the attacker has spoofed responses to the noisy token triggers and redirected the traffic back to the original server (i.e., server1). Therefore, if suddenly one or more end stations or user accounts are connecting to "server1" from a same origin IP, a MITM attack may be taking place. Accordingly, embodiments can generate an alert in such a scenario 1225 due to the non-occurrence of the original pattern caused by the source of the requests 135 (from a non-anticipated source address) not matching the source identified by the source characteristic 506 (i.e., observing a known "what" but not a matching "who").

Exemplary Deployment Environment

Figure 13:
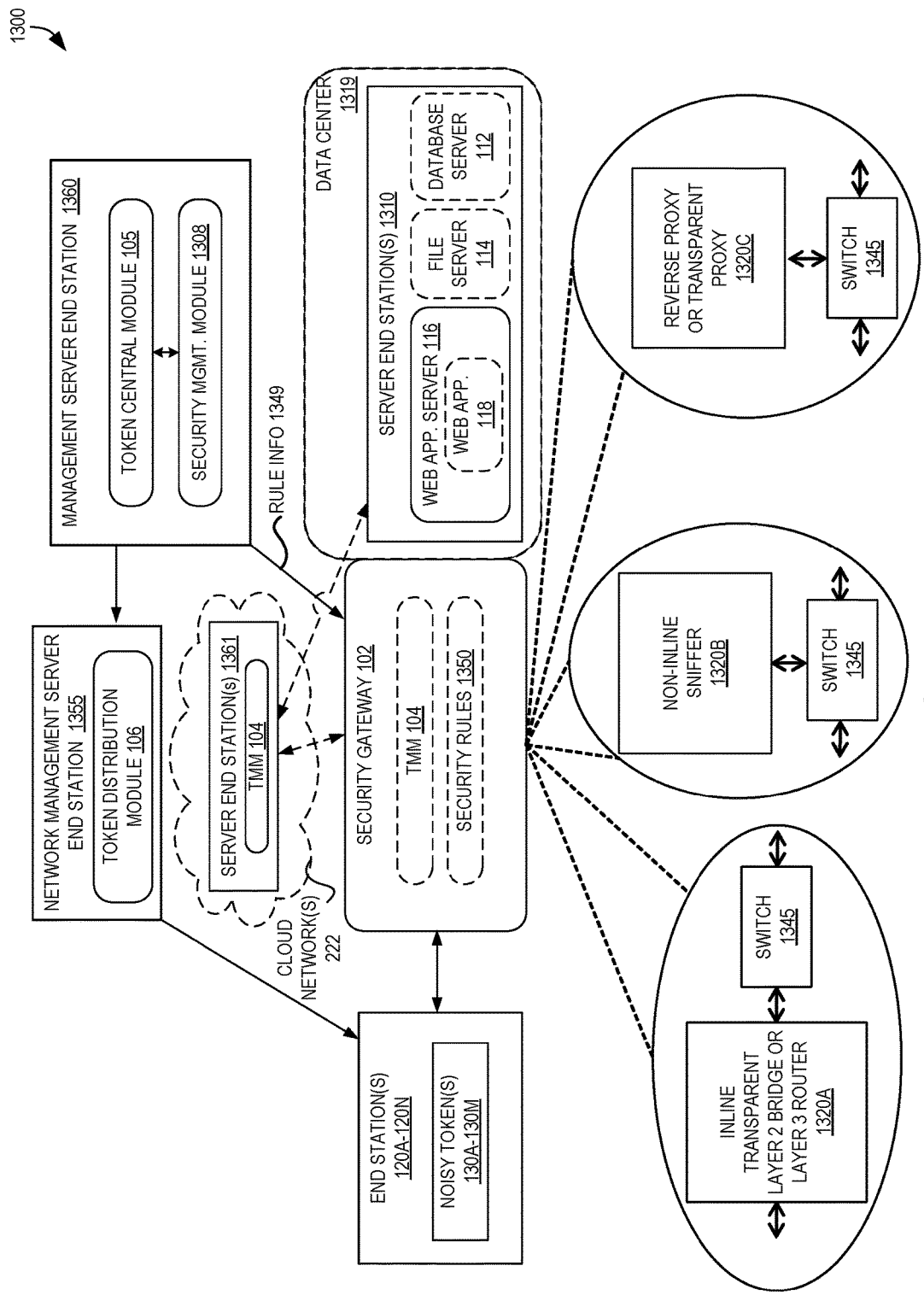
FIG. 13 is a block diagram illustrating an exemplary deployment environment for a token distribution module token central module, and traffic monitoring module according to certain embodiments.

FIG. 13 is a block diagram illustrating an exemplary deployment environment for a token distribution module, token central module, and traffic monitoring module according to certain embodiments.

Specifically, FIG. 13 illustrates one or more end stations 120A-120N having one or more noisy tokens 130A-130M, which connect through a security gateway 102 to one or more server end stations 1310 within a data center 1319. The server end stations 1310 execute one or more of a web application server 116 (that in turn may execute a web application 118), a file server 114, and/or a database server 112. In some embodiments, the security gateway 102 and the server end stations 1310 operate within a LAN, and the one or more end stations 120A-120N also operate within the LAN or connect to the LAN through a WAN (e.g., the Internet) using a VPN.

In this depicted embodiment, the token distribution module 106 is executed by a network management server end station 1355, which may also execute software to distribute Windows® Active Directory Group Policy Objects (GPO), and/or a Microsoft® System Center Configuration Manager (SCCM) component, and/or an IBM® Tivoli® component, and/or another enterprise end station management software package.

In this depicted embodiment, the token central module 105 and security management module 1308 are executed as part of a management server end station 1360, which can also update and configure the security gateway 102 by sending rule information 1349 that can update, add, or remove security rules 1350 utilized by the security gateway 102. In some embodiments, the security gateway 102 does not receive the rule information 1349, but instead has read access to the management server end station 1360, thereby enabling it to fetch/pull the security rules 1350 and/or rule information 1349.

In some embodiments the security gateway 102 could be implemented on the server end stations 1310. However, the security gateway 102 could also execute on a network device that is communicatively coupled between the end stations 120A-120N and the data center 1319.

In some embodiments, the TMM 104 is executed by (or implemented by) one or more server end station(s) 1361, which may or may not be remote from the security gateway 102 and/or server end stations 1310 hosting the server(s) 111. For example, in some embodiments, the analysis module 177 may be implemented by one or more server end stations in a "cloud network" environment, where it may perform various "big data" and/or machine learning techniques (that may require substantial processing) to identify the "regular" or "non-malicious" network traffic patterns (i.e., normal activity patterns). Some or all of the TMM 104 can also be implemented within the security gateway 102.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

FIG. 13 illustrates three different deployments in which the security gateway 102 could be implemented as a separate network device from the server end stations 1310. The three different deployments are as follows: 1) as an inline transparent layer 2 bridge or layer 3 router 1320A coupled in front of a switch 1345; 2) as a non-inline sniffer 1320B connected to a switch 1345 that sits between the end stations 120A-120N and the data center 1319; and 3) as a reverse proxy or transparent proxy 1320C connected to a switch 1345 that sits between the end stations 120A-120N and the data center 1319.

Alternative Embodiments

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A non-transitory computer-readable storage medium having instructions which, when executed by one or more processors of a device, cause the device to implement a module for detecting malicious activity within an enterprise network by performing operations comprising:
    monitoring network traffic originated by one or more enterprise end stations that is destined to one or more servers, wherein the network traffic comprises a first set of one or more request messages originated by the one or more enterprise end stations responsive to non-malicious activity occurring at the one or more enterprise end stations that triggered one or more noisy tokens placed upon those one or more enterprise end stations, wherein the one or more noisy tokens were placed at file system locations or operating system locations of the one or more enterprise end stations to cause the one or more enterprise end stations to generate the network traffic when one or more processes of the one or more enterprise end stations access the one or more noisy tokens;
    generating one or more normal activity patterns characterizing the network traffic based upon the first set of request messages, wherein each of the one or more normal activity patterns identifies one or more characteristics of the network traffic resulting from the non-malicious activity;
    monitoring, for a period of time, additional network traffic originated by the one or more enterprise end stations that is destined to the one or more servers, wherein the additional network traffic comprises a second set of one or more request messages; and
    causing an alert to be generated in response to an analysis of the additional network traffic with regard to the one or more normal activity patterns resulting in a detection of one or more anomalies within the additional network traffic relative to the one or more normal activity patterns.

2. The non-transitory computer-readable storage medium of claim 1, wherein a first of the one or more characteristics of a first of the one or more normal activity patterns comprises a pattern characteristic identifying one or more types of request messages that must be received for the pattern characteristic to be matched.

3. The non-transitory computer-readable storage medium of claim 2, wherein said analysis resulting in the one or more anomalies being detected comprises:
    determining that a first of the second set of request messages does not satisfy, individually or together with others of the second set of request messages, the identified one or more types of request messages of any of the one or more normal activity patterns.

4. The non-transitory computer-readable storage medium of claim 2, wherein a second of the one or more characteristics of the first normal activity pattern comprises a time characteristic that can be utilized to determine a window of time in which the pattern characteristic must be matched.

5. The non-transitory computer-readable storage medium of claim 4, wherein:
    the first normal activity pattern is configured to cause an anomaly to be detected when the one or more characteristics of the first normal activity pattern are not matched at least an existence threshold number of times within the window of time;
    said window of time lies within the monitored period of time; and
    said analysis resulting in the one or more anomalies being detected comprises determining that the one or more characteristics of the first normal activity pattern have not been matched the existence threshold number of times within the window of time.

6. The non-transitory computer-readable storage medium of claim 4, wherein:
    the first normal activity pattern is configured to cause an anomaly to be detected when the one or more characteristics of the first normal activity pattern are matched more than a frequency threshold number of times within the window of time;
    said window of time lies within the monitored period of time; and
    said analysis resulting in the one or more anomalies being detected comprises determining that the one or more characteristics of the first normal activity pattern have been matched more than the frequency threshold number of times within the window of time.

7. The non-transitory computer-readable storage medium of claim 2, wherein:
    the one or more types of request messages identified by the pattern characteristic of the first normal activity pattern comprise a plurality of types of request messages;
    the pattern characteristic further identifies a required order in which the plurality of types of request messages are to be received; and
    said analysis resulting in the one or more anomalies being detected comprises determining that an actual order in which a plurality of request messages of the second set of request messages are received does not match required order identified by the pattern characteristic of the first normal activity pattern.

8. The non-transitory computer-readable storage medium of claim 2, wherein:
    a second of the one or more characteristics of the first normal activity pattern comprises a source characteristic, wherein the source characteristic identifies one or more source identifiers corresponding to one or more expected sources of the one or more types of request messages identified by the pattern characteristic of the first normal activity pattern; and
    said analysis resulting in the one or more anomalies being detected comprises determining that one or more actual source identifiers of one or more request messages of the second set of request messages do not match the source characteristic despite the one or more request messages matching the pattern characteristic.

9. The non-transitory computer-readable storage medium of claim 1, wherein the additional network traffic was caused to be originated by the one or more enterprise end stations due to non-malicious activity but still allows the module to detect the existence of the malicious activity within the enterprise network.

10. The non-transitory computer-readable storage medium of claim 1, wherein at least one of the one or more noisy tokens comprises:
   a symbolic link;
   a shortcut;
   an icon;
   a logon token; or
   a Most Recently Used (MRU) entry.

11. The non-transitory computer-readable storage medium of claim 1, wherein the analysis of the additional network traffic with regard to the one or more normal activity patterns resulting in the one or more anomalies being detected comprises:
   obtaining access to a plurality of access records corresponding to the additional network traffic;
   attempting to match the plurality of access records against pattern characteristics of the one or more normal activity patterns; and
   determining that one of the plurality of access records is an anomaly based upon the one access record not being part of a valid pattern prefix of a pattern characteristic of any of the one or more normal activity patterns.

12. A device, comprising:
   one or more processors; and
   a non-transitory computer-readable storage medium having instructions which, when executed by the one or more processors, cause the device to implement a module for detecting malicious activity within an enterprise network by being adapted to:
   monitor network traffic originated by one or more enterprise end stations that is destined to one or more servers, wherein the network traffic comprises a first set of one or more request messages originated by the one or more enterprise end stations responsive to non-malicious activity occurring at the one or more enterprise end stations that triggered one or more noisy tokens placed upon those one or more enterprise end stations, wherein the one or more noisy tokens were placed at file system locations or operating system locations of the one or more enterprise end stations to cause the one or more enterprise end stations to generate the network traffic when one or more processes of the one or more enterprise end stations access the one or more noisy tokens;
   generate one or more normal activity patterns characterizing the network traffic based upon the first set of request messages, wherein each of the one or more normal activity patterns identifies one or more characteristics of the network traffic resulting from the non-malicious activity;
   monitor, for a period of time, additional network traffic originated by the one or more enterprise end stations that is destined to the one or more servers, wherein the additional network traffic comprises a second set of one or more request messages; and
   cause an alert to be generated in response to an analysis of the additional network traffic with regard to the one or more normal activity patterns resulting in a detection of one or more anomalies within the additional network traffic relative to the one or more normal activity patterns.

13. The device of claim 12, wherein a first of the one or more characteristics of a first of the one or more normal activity patterns comprises a pattern characteristic identifying one or more types of request messages that must be received for the pattern characteristic to be matched.

14. The device of claim 13, wherein said analysis resulting in the one or more anomalies being detected comprises:
   a determination that a first of the second set of request messages does not satisfy, individually or together with others of the second set of request messages, the identified one or more types of request messages of any of the one or more normal activity patterns.

15. The device of claim 13, wherein a second of the one or more characteristics of the first normal activity pattern comprises a time characteristic that can be utilized to determine a window of time in which the pattern characteristic must be matched.

16. The device of claim 15, wherein:
   the first normal activity pattern is configured to cause an anomaly to be detected when the one or more characteristics of the first normal activity pattern are not matched at least an existence threshold number of times within the window of time;
   said window of time lies within the monitored period of time; and
   said analysis resulting in the one or more anomalies being detected comprises a determination that the one or more characteristics of the first normal activity pattern have not been matched the existence threshold number of times within the window of time.

17. The device of claim 15, wherein:
   the first normal activity pattern is configured to cause an anomaly to be detected when the one or more characteristics of the first normal activity pattern are matched more than a frequency threshold number of times within the window of time;
   said window of time lies within the monitored period of time; and
   said analysis resulting in the one or more anomalies being detected comprises a determination that the one or more characteristics of the first normal activity pattern have been matched more than the frequency threshold number of times within the window of time.

18. The device of claim 13, wherein:
   the one or more types of request messages identified by the pattern characteristic of the first normal activity pattern comprise a plurality of types of request messages;
   the pattern characteristic further identifies a required order in which the plurality of types of request messages are to be received; and
   said analysis resulting in the one or more anomalies being detected comprises a determination that an actual order in which a plurality of request messages of the second set of request messages are received does not match required order identified by the pattern characteristic of the first normal activity pattern.

19. The device of claim 13, wherein:
   a second of the one or more characteristics of the first normal activity pattern comprises a source characteristic, wherein the source characteristic identifies one or more source identifiers corresponding to one or more expected sources of the one or more types of request messages identified by the pattern characteristic of the first normal activity pattern; and said analysis resulting in the one or more anomalies being detected comprises a determination that one or more actual source identifiers of one or more request messages of the second set of request messages do not match the source characteristic despite the one or more request messages matching the pattern characteristic.

20. The device of claim 12, wherein the additional network traffic was caused to be originated by the one or more enterprise end stations due to non-malicious activity but still allows the module to detect the existence of the malicious activity within the enterprise network.

21. The device of claim 12, wherein at least one of the one or more noisy tokens comprises:

a symbolic link;
a shortcut;
an icon;
a logon token; or
a Most Recently Used (MRU) entry.

22. The device of claim 12, wherein the analysis of the additional network traffic with regard to the one or more normal activity patterns resulting in the one or more anomalies being detected occurs by the device being adapted to:

obtain access to a plurality of access records corresponding to the additional network traffic;

attempt to match the plurality of access records against pattern characteristics of the one or more normal activity patterns; and determine that one of the plurality of access records is an anomaly based upon the one access record not being part of a valid pattern prefix of a pattern characteristic of any of the one or more normal activity patterns.

* * * * *